US 6,583,835 B1

(12) United States Patent
Yoshida et al.

(10) Patent No.: US 6,583,835 B1
(45) Date of Patent: Jun. 24, 2003

(54) ALIGNMENT FILMS IN A LIQUID CRYSTAL DISPLAY DEVICE AND A METHOD OF MANUFACTURING THE SAME

(75) Inventors: Hidefumi Yoshida, Ebina (JP); Yasutoshi Tasaka, Kawasaki (JP); Takashi Sasabayashi, Machida (JP); Yohei Nakanishi, Zushi (JP); Kenji Okamoto, Hiratsuka (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 242 days.

(21) Appl. No.: 09/629,287

(22) Filed: Jul. 31, 2000

(30) Foreign Application Priority Data

Jul. 30, 1999 (JP) .............................. 11-217878
May 31, 2000 (JP) ...................... 2000-163607

(51) Int. Cl.$^7$ ............................. G02F 1/1337
(52) U.S. Cl. .................. 349/124; 349/128; 349/126
(58) Field of Search ............... 349/124, 127, 349/128, 129, 130, 132, 134

(56) References Cited

U.S. PATENT DOCUMENTS

| 5,786,041 A | * | 7/1998 | Tanenaka et al. ............... 428/1 |
| 6,180,024 B1 | * | 1/2001 | Blackwood et al. ... 252/299.01 |
| 6,191,836 B1 | * | 2/2001 | Woo et al. .................. 349/124 |

* cited by examiner

Primary Examiner—Robert H. Kim
Assistant Examiner—Hoan Nguyen
(74) Attorney, Agent, or Firm—Greer, Burns & Crain, Ltd.

(57) ABSTRACT

A liquid crystal display device including a pair of substrates in a spaced relationship with one another. A pair of alignment films are provided, one alignment film being formed on each substrate such that the alignment films face one another. A liquid crystal layer, including plural liquid crystals, is inserted between the pair of alignment films, wherein the alignment films impart a given pre-tilt angle to the liquid crystals. The alignment films are composed of a material containing at least two types of polymers having a prescribed initial alignment and different alignment variation rates in response to ultra-violet ray irradiation. The pre-tilt angle being adjusted, without rubbing the alignment films, through ultraviolet exposure of the alignment films.

18 Claims, 36 Drawing Sheets

Ultraviolet light exposure finished in one iteration.

Even if the mask is bent, the division position does not change.

FIG.10A  The position of the domain division is clear by using with a rib structure.
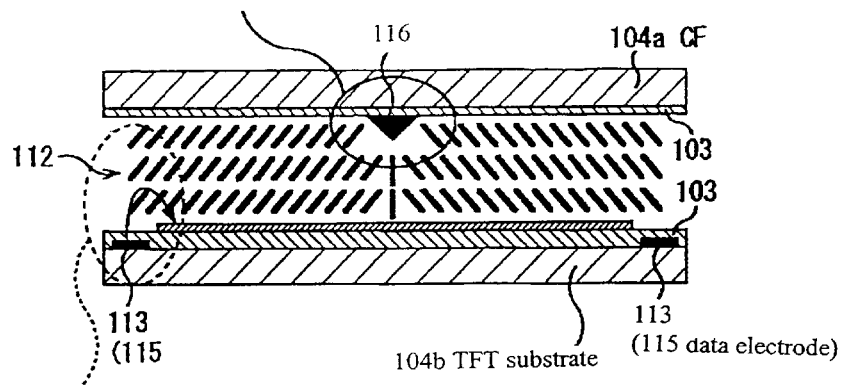
The oblique electric field from the gate electrode or
data electrode assists in the orientation.
FIG.10B
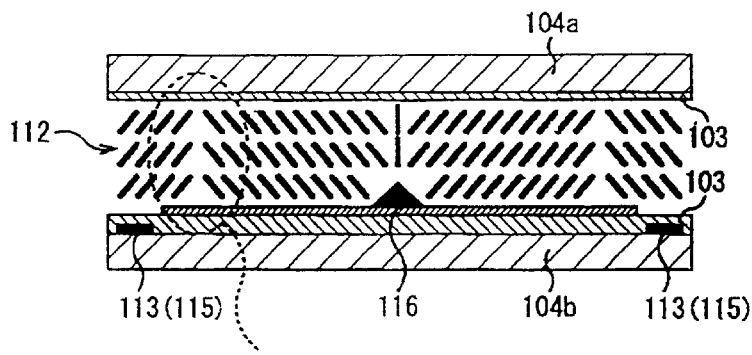
If the orientations are controlled to oppose the orientations caused by the oblique electric field
from the gate electrode or the data electrode, disclinations develop.

(a)

Providing projections (ribs) parallel to the gate electrodes on the CF substrate side is also effective. In this case, the center is the pixel is preferred.

Ultraviolet light exposure state on the TFT substrate side

Forming ribs on the gate electrodes on the TFT side is also effective.

FIG.14A
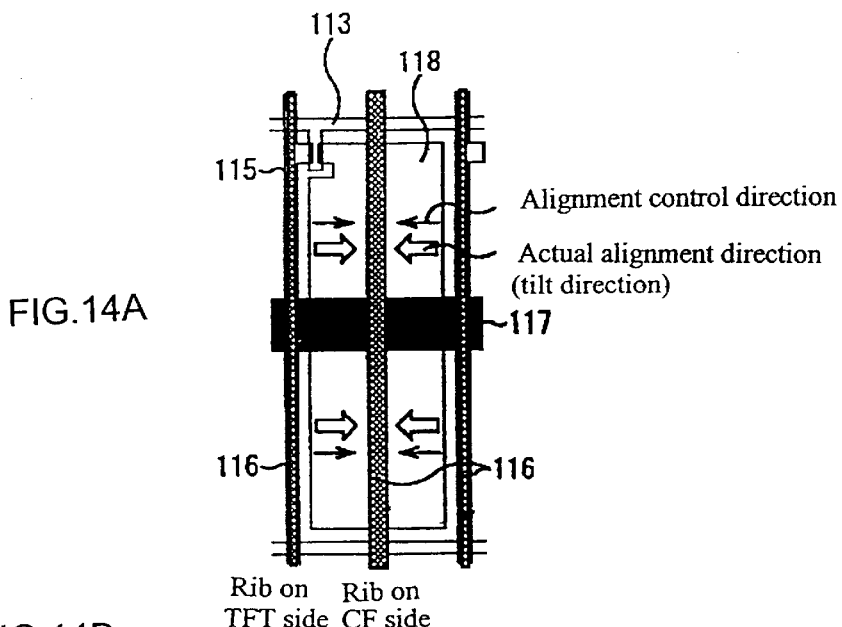
FIG.14B
FIG.14C
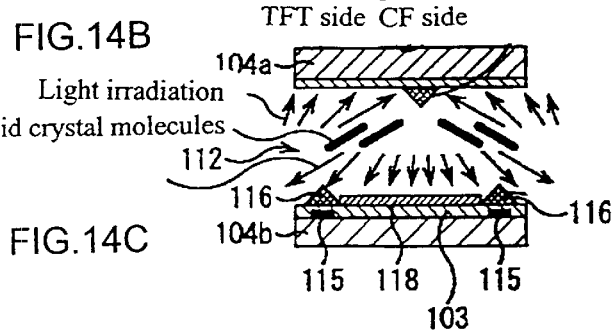

FIG.17A
FIG.17B
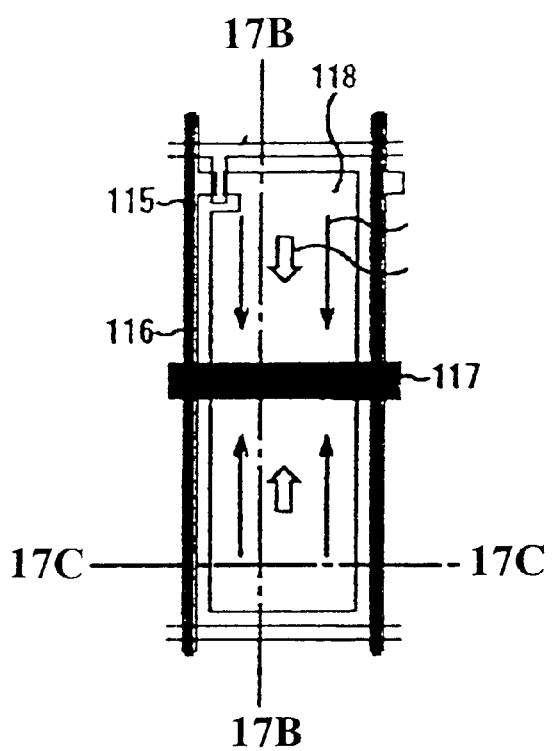
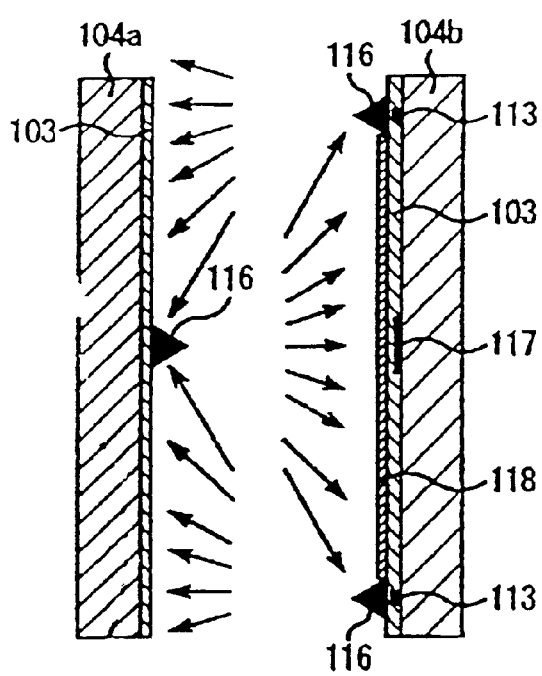
FIG.17C
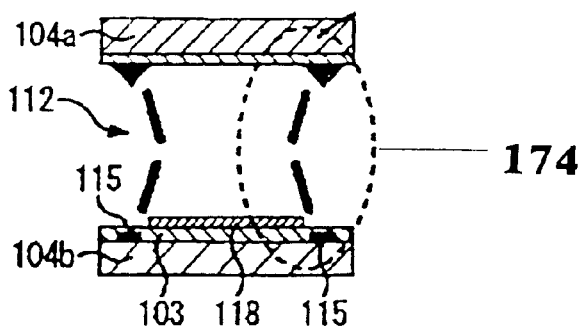

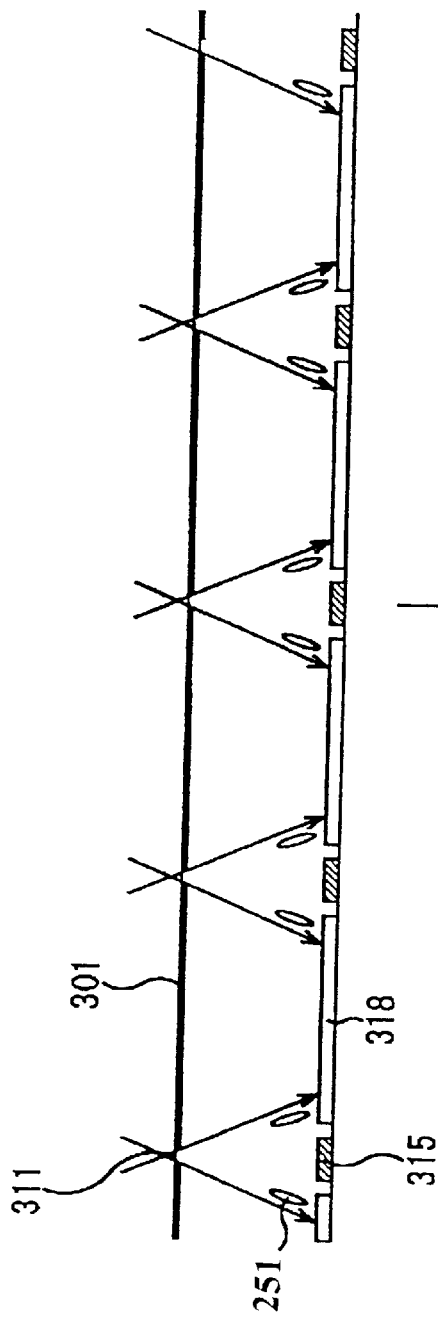
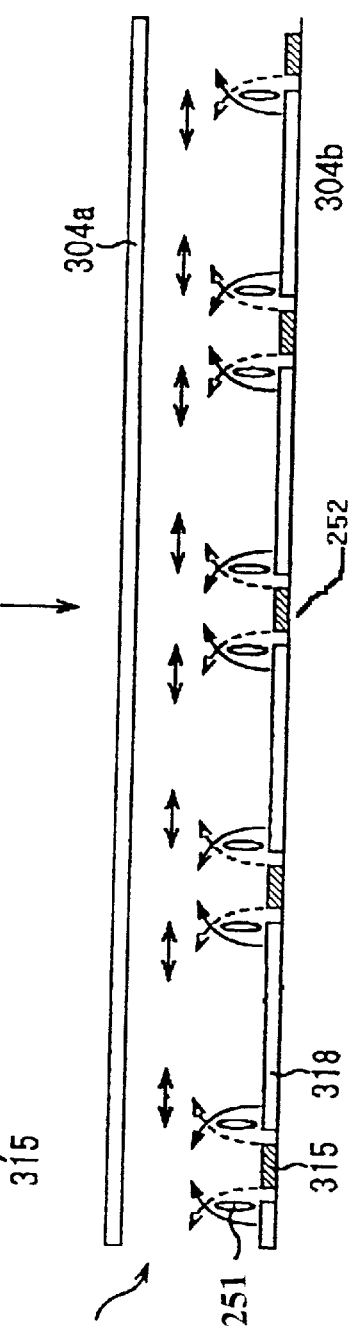

a: light shielding pattern section
b: alignment correction slit
c: light shielding pattern section
d: alignment control slit e: normal spacing of regions
f: spacing of the alignment correction slits FIG.36A
FIG.36B
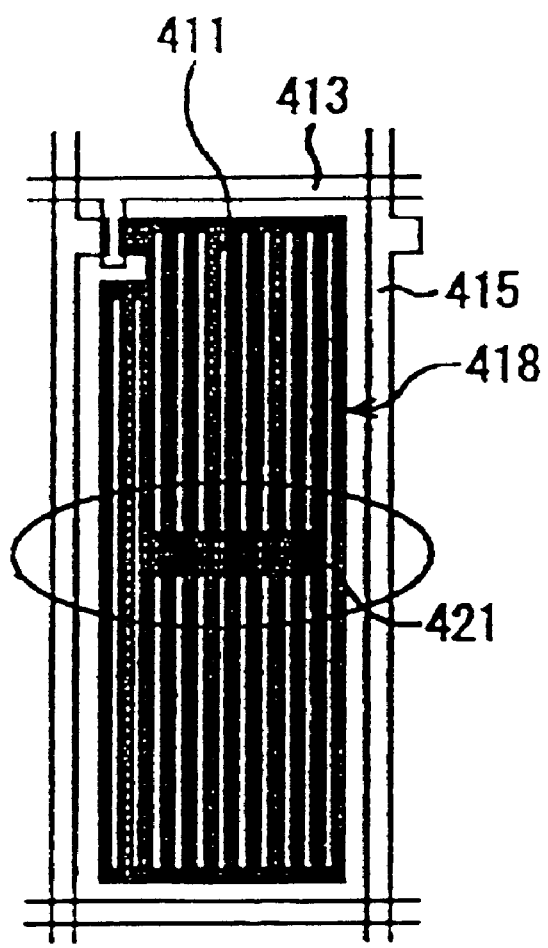
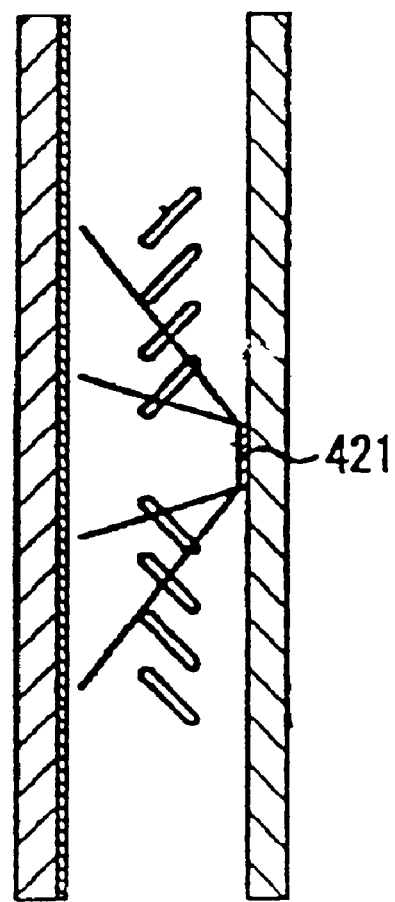

orientation of liquid crystal molecules

ALIGNMENT FILMS IN A LIQUID CRYSTAL DISPLAY DEVICE AND A METHOD OF MANUFACTURING THE SAME

FIELD OF THE INVENTION

The present invention relates to alignment films which orient liquid crystals provided between the alignment films in a liquid crystal display device, and a method for manufacturing the alignment films.

BACKGROUND OF THE INVENTION

In recent years, liquid crystal display devices, particularly, Thin Film Transistor (TFT) liquid crystal display devices which have a twisted nematic (TN) display mode, have come into wide use. For example, they are the general-purpose display devices in personal computers.

Usually, a liquid crystal display device includes a pair of opposing substrates that are maintained with a prescribed interval, electrodes and alignment films formed on the facing surfaces of the substrates, and a liquid crystal layer inserted between the alignment films. The electrodes of one substrate are formed into a common electrode. The electrodes of the other substrate are formed into the pixel electrodes. The pixel electrodes are often provided with an active matrix. In addition, electrodes are provided only on one substrate (for example, IPS mode). A black matrix or color filter is provided on either substrate.

In conventional liquid crystal display devices, the liquid crystal molecules in the liquid crystal layer are oriented in the prescribed direction by rubbing the alignment film. The alignment film is polished by a cloth, for example rayon, which undesirably generates dust within the clean room. Moreover, the rubbing generates static electricity which could potentially result in the breakdown of the TFT of the active matrix.

The inventors of the present invention have proposed in Japanese patent application HEI 9-354940 and Japanese patent application HEI 11-72085 a technique for orienting the liquid crystal molecules through the use of ultra-violet rays. As illustrated in FIG. 37, ultraviolet light is irradiated at an angle of 45°, for example, with respect to the surface of the polyimide alignment film 501, thereby orienting the liquid crystal molecules 502.

The relationship between the pre-tilt angle and the amount of ultra-violet ray irradiation realized by the method of Japanese patent application 11-72085 is illustrated in FIG. 38.

From the relationship shown in the drawing, when the volume of ultra-violet ray irradiation is low and the pre-tilt angle is large, black points occur in locations centered around spacers used maintain the spacing between the substrates (cell gap) of the liquid crystal display device. Correspondingly, if the ultraviolet light exposure is high, flow-induced orientations accompanying the injection of liquid crystal are produced. Both are primary causes of poor displays. In this case, an appropriate range for the pretilt angles that obtain displays having good images is a narrow range of no more than 1.0° centered near 89°.

One of the problems associated with the teachings of Japanese patent application HEI 11-72085 is strong reliance on the proper control of the angle and intensity of the ultra-violet rays. Optimum results require a maximum of a ±10% intensity deviation in order to obtain a given pre-tilt angle. Referring to the properties curve of FIG. 8, a deviation of ±0.2% commonly occurs both in the angle of irradiation and in the intensity of the ultra-violet rays, making it difficult to reliably obtain a specified pre-tilt angle. Consequently, the probability of poor display occurring increases and there is a concern that the display will be unreliable.

Accordingly, an object of the present invention is to provide an improved method for orientation of an orientation film in which a desired pre-tilt angle of liquid crystal molecules can be assured without the need for rubbing the orientation film, and which does not suffer from the aforementioned problem relating to proper control of the angle and intensity of the ultra-violet rays.

Another object of the present invention is to increase the contrast in the display surface and prevent light and dark reversal in the display, and provide an alignment technique that exposes the alignment film with ultraviolet light from different directions and produces domains in the pixels. As shown in FIGS. 39A and 39(B, two domains are created in the alignment film 611 by using an optical mask 601 formed with a slit 602. The optical mask 601 is placed above the alignment film 611, and parallel ultraviolet light is irradiated at an incline from above the optical mask 601. Next, parallel light is irradiated again at an incline having a different angle (Unexamined Japanese Patent Publication (Kokai) No.Hei 11-133429). Thus, the alignment film 601 is irradiated multiple times, one time for each domain. Naturally, this leads to an increase in the number of processes.

The method disclosed in Hei 11-133429 is further problematic as the multiple irradiations tend to cause bending of the optical mask. As shown in FIG. 40, bending of the optical mask 601 causes offsets in the exposure positions of the ultraviolet light on the alignment film 611. For example, even if the ultraviolet light is irradiated in two directions with the center of the pixel as the boundary, the domain will have an offset center position. The size of the glass substrate has tended to increase each year, and the use of a 1 m² substrate is expected. If the thickness of the optical mask is 1 cm, bending by several dozen μm at the center of the optical mask will be apparent based on calculations. Thus, design offsets that cannot be ignored will occur.

Consequently, if domains are created as described above, in addition to the difficulty in controlling the angle and intensity of the irradiated ultraviolet light, the processes will necessarily become more complex.

In view of the problems described above, another object of the present invention is to provide a liquid crystal display device that has a simple structure and is provided with alignment films that can very stably and easily obtain the appropriate pretilt angles for the liquid crystal molecules by a simple alignment process without rubbing.

Another object of the present invention is to provide an alignment apparatus, an alignment method able to easily and accurately create domains without increasing the number of processes.

BACKGROUND OF THE INVENTION

The present invention provides an improved liquid display device and a method for creating the same. According to a first embodiment, the liquid crystal display device includes a pair of substrates in a spaced relationship with one another. A pair of alignment films are provided, one alignment film being formed on each substrate such that the alignment films face one another. A liquid crystal layer, including plural liquid crystals, is inserted between the pair of alignment films, wherein the alignment films impart a given pre-tilt angle to the liquid crystals. The alignment films are composed of a material containing at least two types of polymers having a prescribed initial alignment and different alignment variation rates in response to ultra-violet ray irradiation. The pre-tilt angle being adjusted, without rubbing the alignment films, through ultraviolet exposure of the alignment films.

Also disclosed is an alignment apparatus for adjusting the alignment of an alignment film with ultraviolet light. The alignment apparatus includes a light source to irradiate scattered ultraviolet light, and an optical mask disposed under the light source. The optical mask is formed with at least one slit. In operation the optical mask is placed above the alignment film and scattered ultraviolet light irradiates from the light source through the optical mask. Diffuse light exposes the alignment film, and produces domains in the liquid crystal that depend on the directions of diffusion of the diffuse light.

BRIEF DESCRIPTION OF THE DRAWINGS

The above-described objects of the invention will be apparent from the following detailed description of the invention, while referring to the attached drawings in which:

FIGS. 10A and 10B are cross-sectional views shows the set up of the rib-shaped parts in a substrate when there are two domains;

FIGS. 14A–14C are schematic diagrams of a TFT LCD having left and right domains;

FIGS. 17A–17C are schematic diagrams of a TFT LCD having top and bottom domains;

FIGS. 25A and 25B are cross-sectional views shows the important structures of an alignment apparatus according to a fourth embodiment;

FIGS. 36A and 36B are schematic diagrams of another example of a fifth embodiment;

DETAILED DESCRIPTION OF THE PREFERRED EMBODIMENTS

Figure 1:
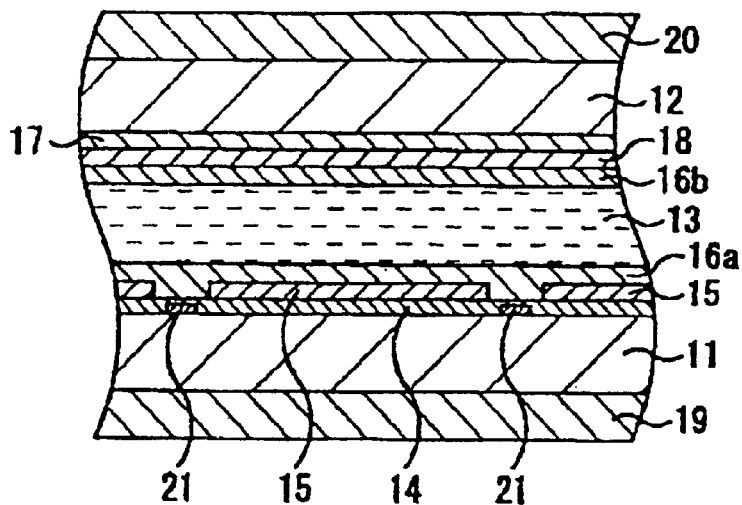
FIG. 1 is a cross-sectional view showing the overall structure of a liquid crystal display device according to one embodiment of the present invention.

Various specific embodiments applying the present invention are explained in detail while referring to the drawings.

FIG. 1 is a cross-sectional view of a liquid crystal display device according to a first embodiment. The liquid crystal display device includes a pair of opposing transparent glass substrates 11, 12 with a liquid crystal layer 13 interposed therebetween.

A plurality of pixel electrodes 15 are formed on an intervening insulation layer 14 provided on transparent glass substrate 11, and a transparent alignment film 16a covers the pixel electrodes 15. A color filter 17, a common electrode 18, and an alignment film 16b are successively layered on the transparent glass substrate 12. The alignment films 16a, 16b push towards each other to hold the liquid crystal layer 13, and the glass substrates 11, 12 are fixed.

Polarizers 19, 20 are provided on the outer sides of the substrates 11, 12. The pixel electrodes 15 are formed with the active matrix. In the illustrated example, the data bus lines 21 in the active matrix are shown. The electrodes are provided on only one substrate (for example, in the IPS mode).

The alignment film 16a(16b) provides a prescribed orientation property for the liquid crystal molecules in the liquid crystal layer 13. The prescribed orientation is realized by irradiating ultraviolet light from an inclined direction to the liquid crystal layer 13 without rubbing.

Specifically, the alignment film 16a (16b) is composed of a material containing two polymers x1, x2 having different rates of change of the pretilt angles in response to ultraviolet light exposure. Polymer x1 responds extremely rapidly to ultraviolet light, and its pretilt angle rapidly decreases under a small ultraviolet light exposure. In contrast, polymer x2 responds extremely slowly to ultraviolet light and the pretilt angle is hardly changed at all by ultraviolet light exposure. Using mixtures or copolymers of three or more polymers having different rates of change of the pretilt angle may achieved.

Figure 38:
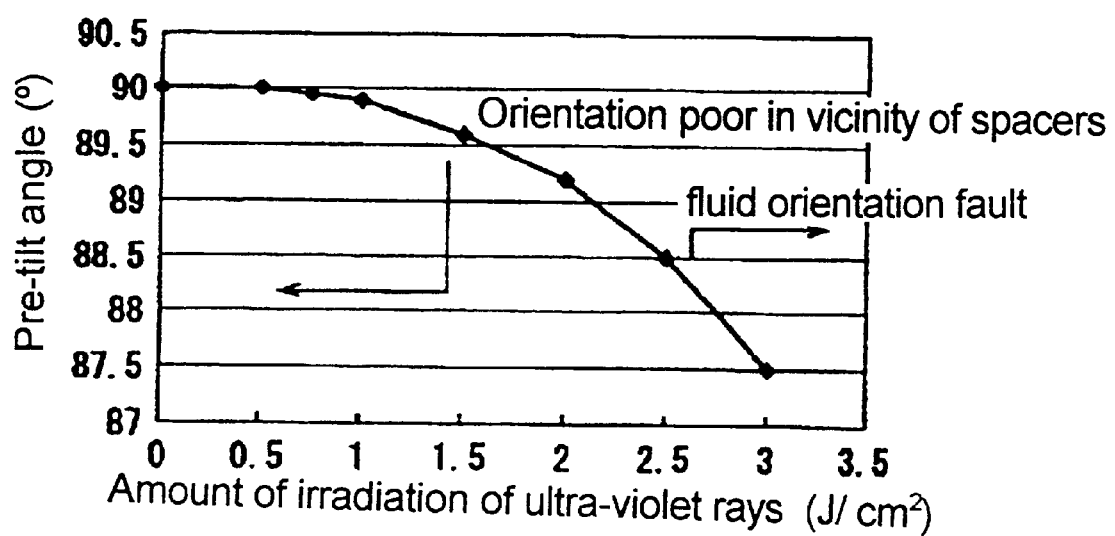
FIG. 38 is a characteristic plot showing changes in the pretilt angle with respect to the ultraviolet light exposure for alignment films composed of one polymer.
Figure 39A:
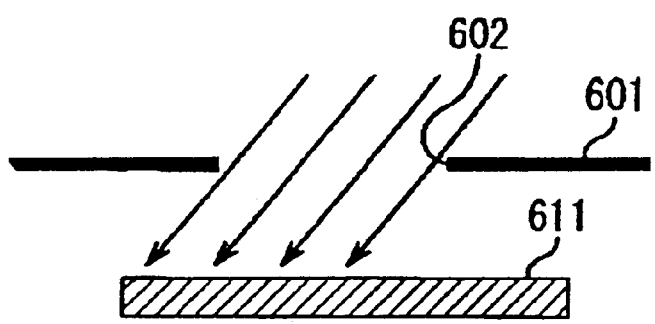
FIGS. 39A and 39B are cross-sectional views showing two domains implemented in a conventional alignment film.
Figure 39B:
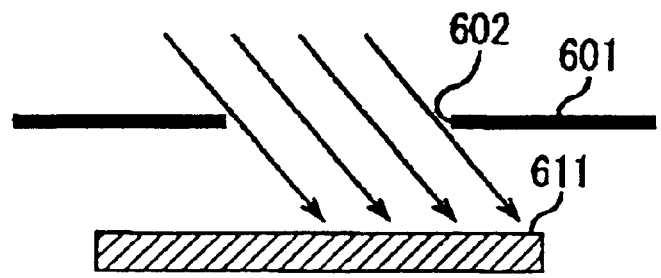
Figure 40:
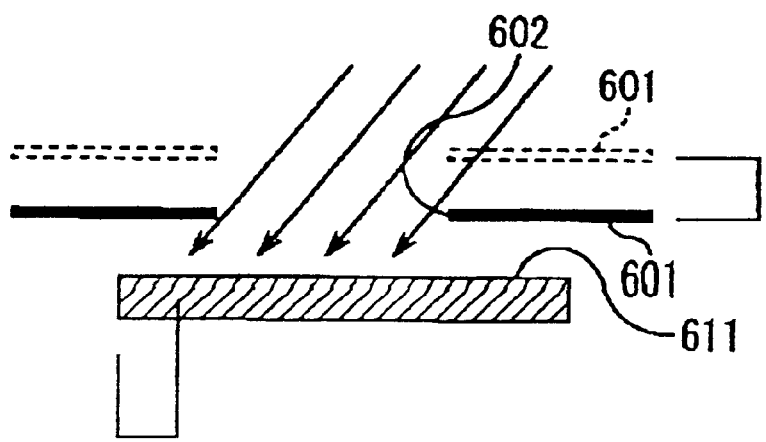
FIG. 40 is a cross-sectional view is used to describe the problems when the optical mask is bent.

FIG. 38 is a graph showing the relationship between the ultraviolet light exposure (J/cm$^2$) and the pretilt angle (°) for a given polymer. Notably, the change in the pretilt angle is large with respect to slight changes in the ultraviolet light exposure, making it difficult to achieve a desired pretilt angle. Ideally, the pretilt angle should rapidly decreases to a desired value under a small ultraviolet light exposure, and thereafter maintain the desired pretilt angle regardless of additional ultraviolet light exposure.

Figure 2:
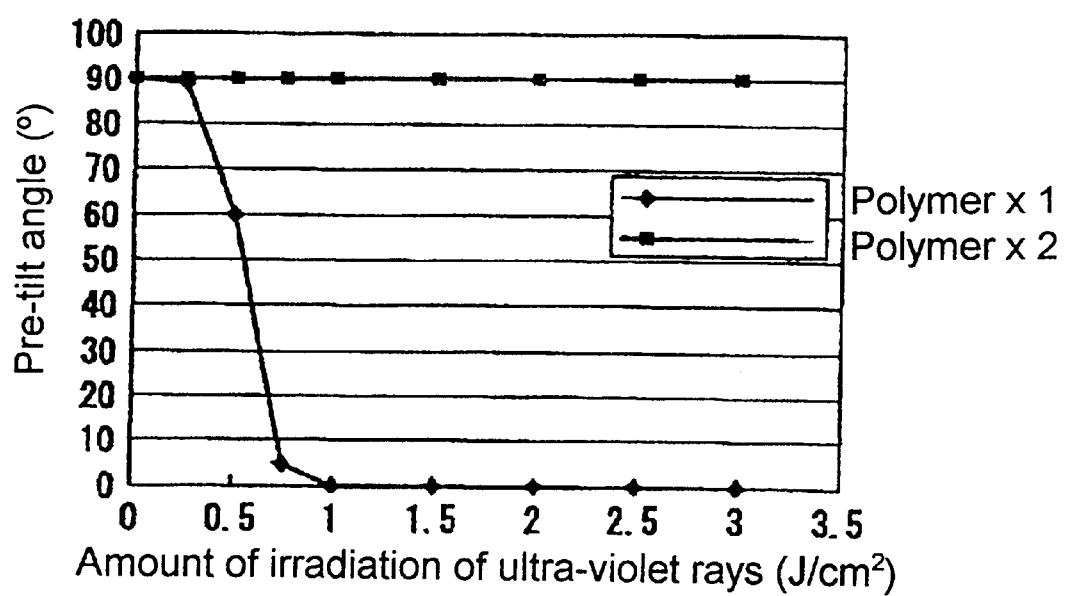
FIG. 2 is a characteristic plot showing changes in pre-tilt angles states for alignment films with respect to the ultra-violet light exposure.

As shown in FIG. 2, the alignment film 16a (16b) is formed by using polymer x1 which rapidly decreases the pretilt angle under ultraviolet light exposure (J/cm$^2$) and polymer x2 which does not change the pretilt angle and has almost no dependence on the ultraviolet light exposure.

The polymer for alignment film 16a (16b) is a vertically aligned polyimide or polyamic acid. An example is shown below.

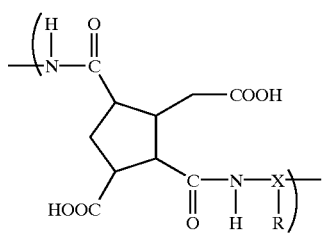

The polymer considered has the alkyl side chain (alkyl group) R as shown in formula 1 and randomly projects to the surface of the alignment film 16a (16b). If ultraviolet light irradiates the surface, photodecomposition develops and breaks the straight chain that supports the alkyl side chain R which essentially reduces the alkyl side chain R and subsequently appears as a decrease in the pretilt angle of the liquid crystal molecules. Polymer x1 has a structure in which the straight that supports the alkyl side chain R is remarkably easy to break compared to polymer x2. Specifically, a region where photodecomposition easily occurs, for example, a double bond region, is provided as the straight chain supporting the alkyl side chain R of the polymer x1. If ultraviolet light irradiates this double bond region, photodecomposition develops even for an extremely small exposure and causes a substantial decrease in the pretilt angle in a short time.

Assuming, for the purposes of illustration, a copolymer composed of twenty percent polymer x1 and eighty percent polymer x2. When the ultraviolet light exposure is initiated, the state of polymer x1 within the copolymer rapidly changes until the amount of the alkyl side chain R that manifests the pretilt angle is reduced to essentially 0. In contrast, polymer x2 within the copolymer maintains its initial state of vertical alignment because there is no double bond region in the straight chain of the alkyl side chain R. Therefore, the overall copolymer maintains a nearly constant pre-tilt value after the specified time has elapsed in which the amount of the alkyl side chain R is decreased to 80 percent.

The criteria for selecting polymers x1 and x2 to obtain a suitable alignment film having the characteristics described above will now be described.

Figure 3:
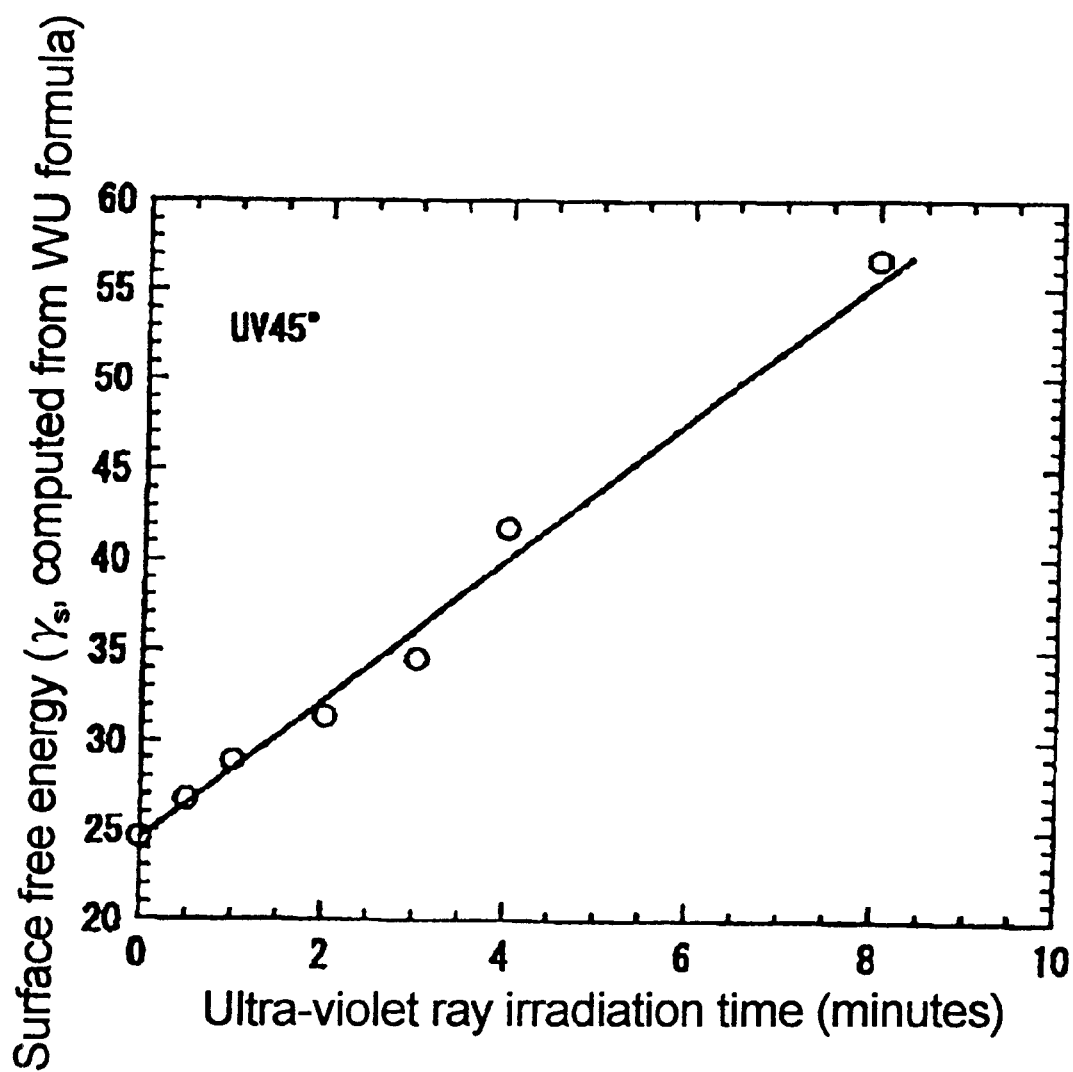
FIG. 3 is a characteristic plot showing the surface free energy changes with respect to the ultraviolet light exposure for alignment films composed of one polymer.

FIG. 3 shows the relationship between the ultraviolet light exposure time (minutes) on the alignment film surface and the surface free energy (γs: Helmholtz free energy per unit area). If a small amount of ultraviolet light is irradiated, the surface energy also becomes small and the surface free energy increases along with the ultraviolet light irradiation and finally becomes a nearly constant value.

Figure 4A:
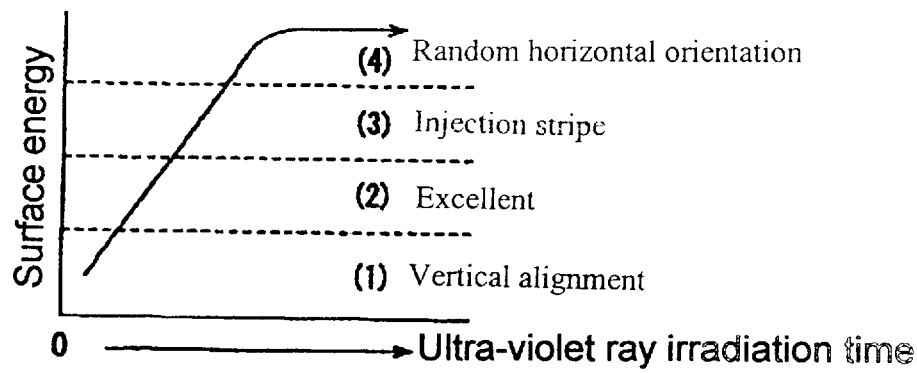
FIG. 4A is a characteristic plot showing the surface free energy changes with respect to the ultraviolet light exposure for alignment films composed of one polymer.

As shown in FIG. 4A, if the surface free energy increases with the increase in the ultraviolet light exposure time, the so-called injection stripe from the injection port is generated when the liquid crystal is injected. Furthermore, when the exposure time increases, the vertical alignment is not exhibited at the earliest time and the alignment moves to a random horizontal alignment.

The present inventors discovered that the surface free energy accompanying the increase in the ultraviolet light exposure time (amount of exposure) successively moves from region (1) to region (4). Region (1) is the initial state exhibiting vertical alignment, region (2) exhibits good image display with no generation of flow-induced orientation defects or defects near the spacers, region (3) exhibits injection strips caused by flow-induced orientations, and region (4) exhibits horizontal alignment.

Figure 4B:
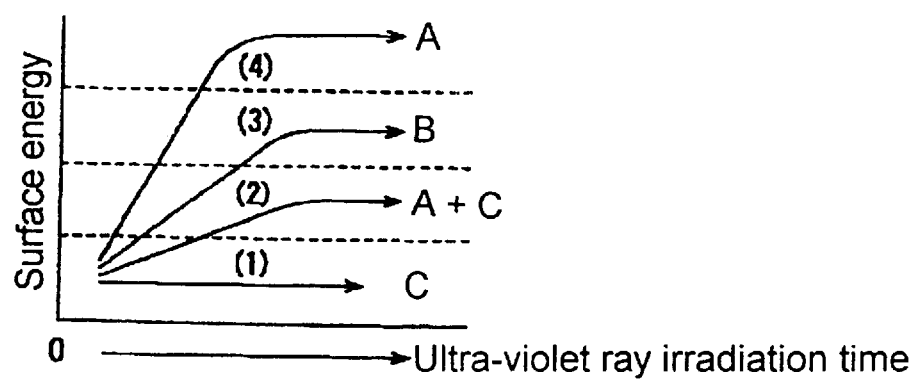
FIG. 4B is a characteristic plot showing the surface free energy changes with respect to the ultraviolet light exposure for several different alignment films.

As shown in FIG. 4B, the alignment film may be classified according to surface free energy into three general type. Alignment film A rapidly moves into region (4) in response to a small ultraviolet light exposure (short time) and has random horizontal alignments. Alignment film B moves into region (3) after a predefined amount of ultraviolet light exposure, and at a generally slower rate than alignment film A. Alignment film C generally remains in region (1) regardless of the amount of ultraviolet light exposure. Moreover, the desired state (Region (2)) is implemented by properly combining alignment films A to C.

Figure 4C:
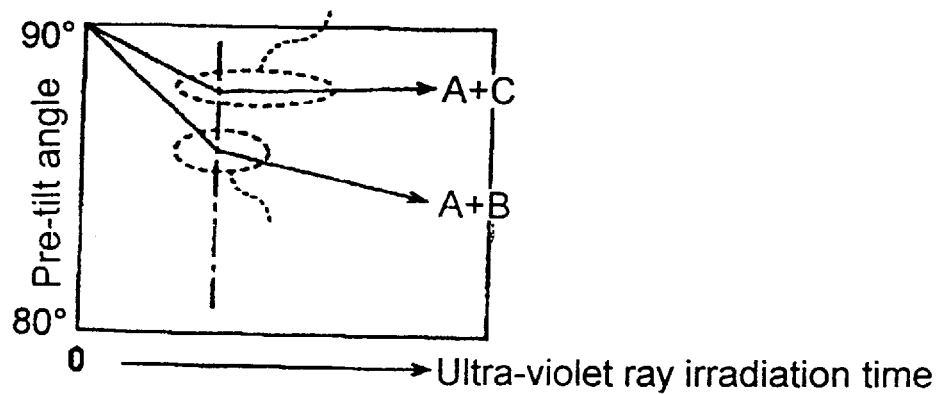
FIG. 4C is a characteristic plot showing changes in pre-tilt angles states for several different alignment films with respect to the ultraviolet light exposure.

FIG. 4C shows the relationship between the ultraviolet light exposure and the pretilt angle for the combinations of alignment films A and B and alignment films A and C. If alignment films A and B are combined, the pretilt angle continues to slowly decrease as the ultraviolet light exposure increases and does not contribute to an increase in the margin, and acceptable orientations are not achieved. In contrast, if alignment films A and C are combined, a region in which the pretilt angle hardly changes is created even if the ultraviolet light exposure changes, and orientations having a wide margin are achieved.

As described above, suitable polymers x1 and x2 exhibit both extreme properties related to the manifestation of the pretilt angle. In other words, polymer x1 will have random horizontal alignments caused by a small ultraviolet light exposure (short time period). In contrast, polymer x2 still maintains the initial vertical alignment. Thus, with the surface free energy as the criterion, alignment film A (polymer) is appropriately selected to be polymer x1 and alignment film C to be polymer x2.

Next, the alignment method which is the main process of the embodiment in the method for manufacturing liquid crystal display devices is described.

Referring back to FIG. 1, after the insulation film 14 is deposited in a layer on the surface of the transparent glass substrate 11, the color filter 17 and the pixel electrodes 15 are successively formed on the surface of the transparent glass substrate 12.

Next, a vertically aligned polyimide or polyamic acid (see formula 1) manufactured by Japan Synthetic Rubber Ltd. is used for polymers x1 and x2 having the above properties on the surfaces of the transparent glass substrates 11, 12. According to a preferred embodiment, polymers x1 and x2 are mixed or copolymerized at a 2:8 ratio and form the alignment films 16a, 16b on the surfaces of the transparent glass substrates 11, 12. However, different ratio's may be selected depending on the desired pre-tilt angle.

Figure 5:
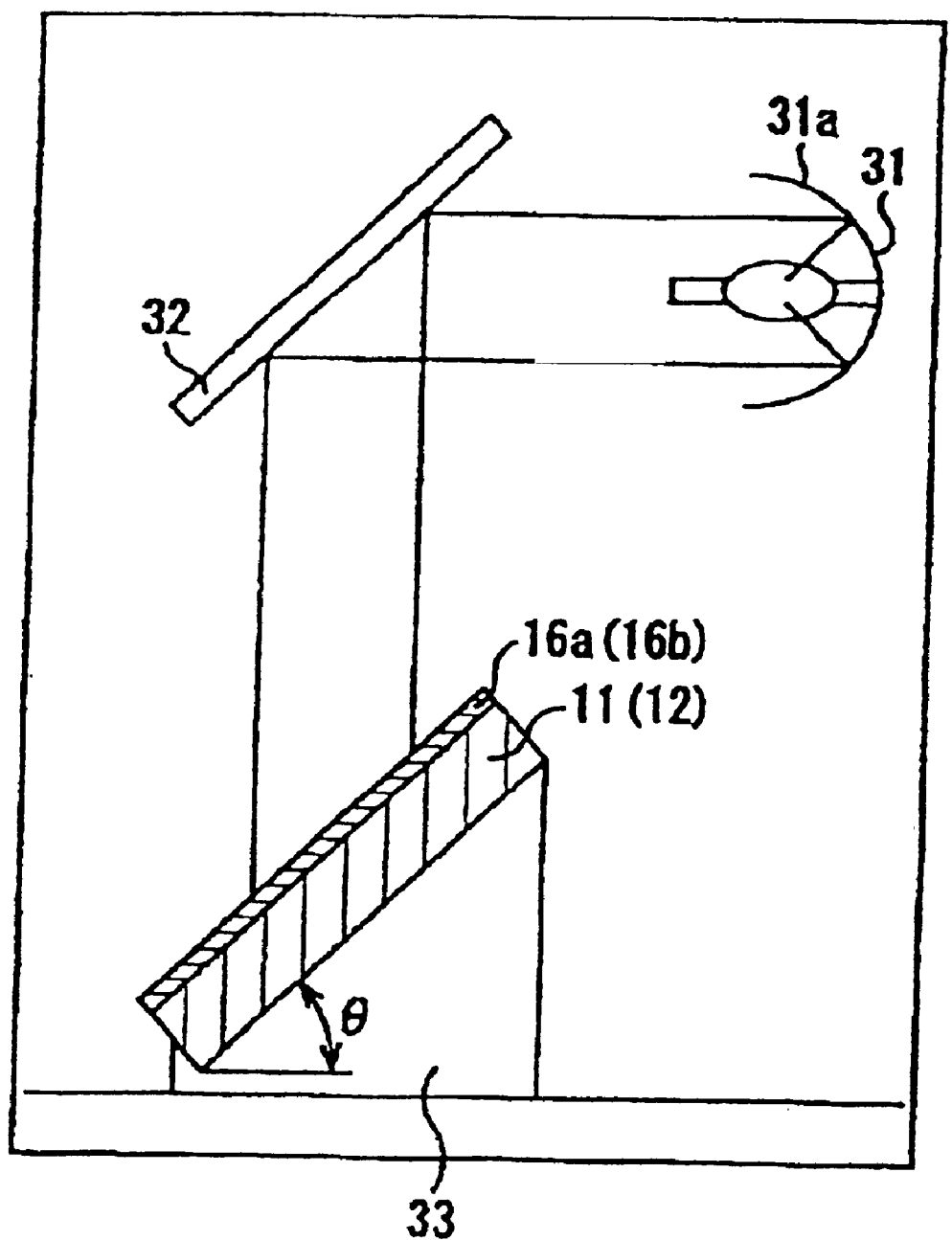
FIG. 5 is a schematic diagram of an apparatus for irradiating an alignment film according to the present invention.

FIG. 5 illustrates an alignment apparatus useful for implementing alignment processing on the target film.

The alignment apparatus includes of a light source 31 to irradiate non-polarized ultraviolet light, a mirror 32, and a holder 33 for supporting the transparent glass substrate 11 (12) forming the alignment film 16a (16b). The holder 33 supports the transparent glass substrate 11 (12) at an incline with respect to the optical axis of the ultraviolet light. The parallel ultraviolet light from the light source 31 is incident at an angle of θ=45° with respect to the surface of the alignment film 16a (16b) (or at a specified angle less than 45°).

The light source 31 is a short-arc xenon mercury lamp, includes a parabolic reflector 31a, and exposes nearly parallel non-polarized ultraviolet light. The spectral distribution of the ultraviolet light wavelengths has a peak near 250 nm. In this spectral distribution, the wavelength components at and above 300 nm are judged to not contribute to appearance of the pretilt angle. Ultraviolet light having a wavelength no more than 280 nm is suited to effectively producing the pretilt angle. The P-waves and S-waves for the polarized ultraviolet light to be irradiated can have the state with more P-waves than S-waves or the state with only P-waves.

The alignment apparatus having the above structure irradiates ultraviolet light from an angle of 45° at an incline with respect to the surface of the alignment film 16a (16b). Polymer x1 decreases the pretilt angle under several dozen mJ/cm$^2$ of ultraviolet light exposure. Polymer x2 produces no change in the pretilt angle even when exposed to several J/cm$^2$ of ultraviolet light. Therefore, the ultraviolet light exposure is set to 1 J/cm$^2$.

The reliable demonstration of the above properties of polymers x1 and x2 is considered here. A suitable relationship between the ultraviolet light exposure and the pretilt angle is at least a 2° change in the pretilt angle for ultraviolet light exposure no more than 0.5 J/cm$^2$ for polymer x1, and a change of no more than 0.5° in the pretilt angle for no more than 1 J/cm$^2$ ultraviolet light exposure for polymer x2.

Figure 6:
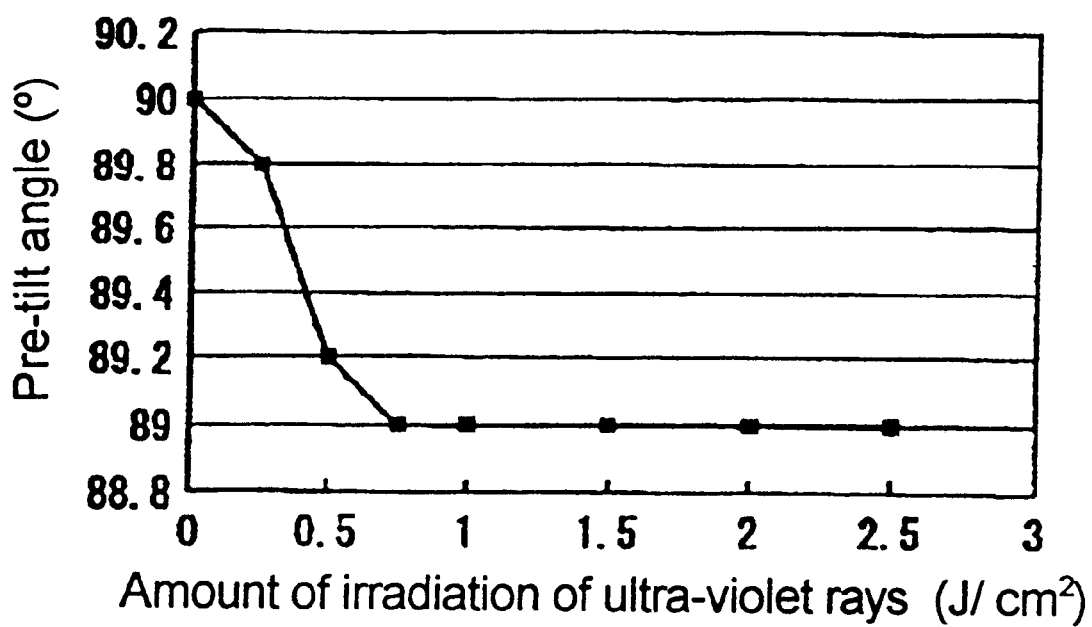
FIG. 6 is a characteristic plot showing the ideal changes in the pretilt angle with respect to the ultraviolet light exposure for the alignment films in a liquid crystal display device according to the present invention.

As shown in FIG. 6, when the ultraviolet light was actually irradiated under these conditions, a stable pretilt angle around 89° could be obtained. Fluctuations in the pretilt angle in the ultraviolet light exposure range of 1±0.3 J/cm$^2$ were no more than 0.1°. Consequently, even if fluctuations arise in the amount of exposure of ultraviolet light, the desired pretilt angle is obtained.

Next, the liquid crystal is injected between the pair of transparent glass substrates 11, 12 to form the liquid crystal layer 13, then the injection port is sealed. After hardening, various post processes, which do form part of the claimed invention, are performed to finish the liquid crystal display device.

As described above, an alignment film 16a (16b) imparting a desired pre-tilt may be easily and reliably achieved (without rubbing).

Figure 7:
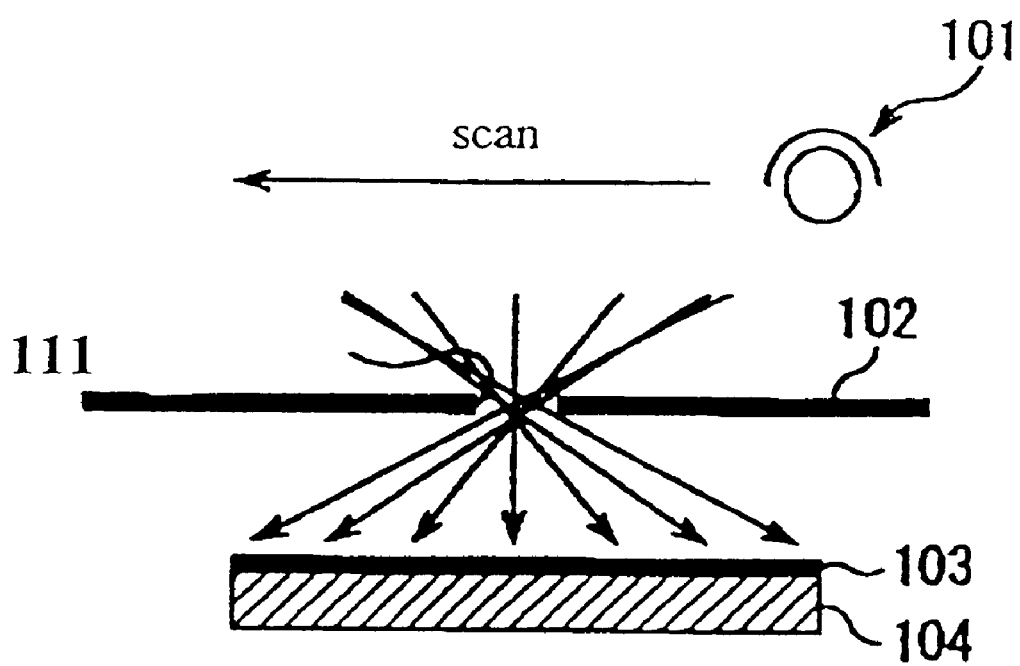
FIG. 7 is a cross-sectional view showing the main structures of an apparatus for irradiating an alignment film according to another embodiment.

A method and apparatus for producing domains in the alignment films will now be explained with reference to FIG. 7

The alignment apparatus includes a light source 101 that irradiates scattered ultraviolet light and an optical mask 102 that is placed below the light source 101 and is formed with a slit 111.

The light source 101 is an ultraviolet lamp having the property of scattering light. For example, a tubular low-pressure mercury lamp is one version. Its shape is similar to an ordinary long fluorescent lamp, but the gas component or glass material for the heavy glass tube differs. The ultraviolet light particularly near the wavelength of 250 nm is irradiated as scattered light.

The optical mask 102 is disposed at a constant distance from the coating of the alignment film 103 or the printed substrate 104, for example, separated by approximately 50 μm. A slit 111 in the optical mask 102 is formed to transmit the scattered ultraviolet light. If the light source 101 is a mercury lamp and scans in the direction indicated by the arrow in FIG. 7 above the optical mask 102, diffuse light that spreads out centered on the slit 111 is produced. The diffuse light exposes the alignment film 103, and two domains that depend on the directions of diffusion of the incline of the diffuse light are created with the region directly under the slit 111 as the boundary. Notably, two domains having different inclines are created by a single ultraviolet light exposure.

Light source 101 symmetrically irradiates the diffuse ultraviolet light from an inclined direction with respect to the surface of the alignment film 103 about the center of symmetry which is the region directly below the slit 111 of the optical mask 102. Therefore, two domains are automatically created in the alignment film 103 with the center of symmetry as the boundary. In this case, the exposure angle changes as the diffuse light moves away from the center of symmetry to obtain a liquid crystal layer with superior visual characteristics and a plurality of pretilt angles. The resulting alignment film has the following properties: (1) the directions in which the liquid crystal molecules fall in mutually opposite directions, (2) the alignment in the central region where the molecules fall is the vertical alignment, and (3) the magnitude of the surface energy of the alignment film becomes larger or smaller closer to the slit. Therefore, a liquid crystal display device provided with this alignment film produces multiple domains at the specified boundaries in the liquid crystal, and the surface energy of the alignment film reaches a maximum or a minimum at the boundaries of the domains and either decreases or increases when moving away from the boundaries.

Figure 8:
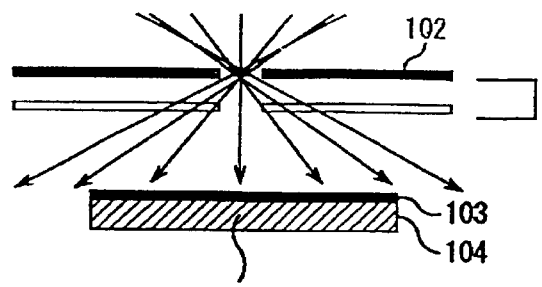
FIG. 8 is a cross-sectional view showing the state of the ultraviolet light exposure when the optical mask is bent.

The expected domains are produced without being significantly affected using the above-described structure even if the optical mask 102 bends. By manner of illustration, FIG. 8 shows that the center of symmetry of the irradiating light does not change even if the optical mask 102 is bent because the original scattered light falls incident perpendicular to the optical mask 102. However, because the region of the incoming light changes, this margin must be estimated to design the gap between the optical mask 2 and the substrate and the width of the slit 111.

The alignment film 103 is preferably a copolymer of the type described previously. Specifically, a copolymer of two or more polymers selected to provide a pretilt angle having a constant value near 90° when the ultraviolet light exposure exceeds some level. By using alignment films having this property, the vertical alignment is maintained directly below the slit 111 and the pretilt angle of the liquid crystal layer has a stable distribution from 90° to the constant value in response to the exposure angle and the amount of exposure of the scattered light. The ultraviolet light exposure is finished in one iteration.

In addition, the preferred alignment film has the characteristic of starting to change the pretilt angle from an initial vertical alignment in response to ultraviolet light exposure, and returning to the vertical alignment by exposing ultraviolet light again.

Figure 9:
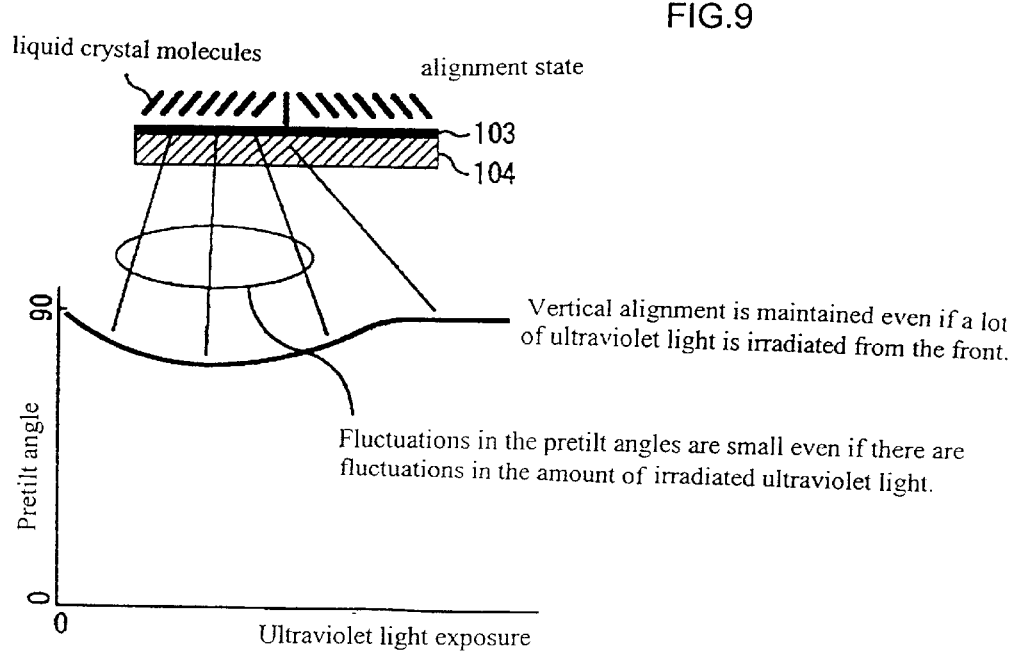
FIG. 9 is a characteristic plot shows the changes in the pretilt angle accompanying the ultraviolet light irradiating the alignment film of the present invention.

FIG. 9 shows the changes in the pretilt angle accompanying the ultraviolet light exposure of the alignment film. As the ultraviolet light exposure increases, the alignment moves from non-vertical to a vertical alignment. As described above, the alignment rapidly changes from the initial (non-vertical) state to a final (vertical) state in response to UV exposure, and thereafter generally maintains the final (vertical) state regardless of additional UV irradiation. Notably, fluctuations in UV irradiation cause only minor changes in alignment.

In this case, because the alignment does not become the horizontal alignment even directly below the slit 111, where a lot of ultraviolet light is irradiated, the alignments do not become disordered. It should be appreciated that the use of a conventional film would result in horizontal alignment below slit 111 where a great deal of ultraviolet light is exposed, resulting in a region with poor alignment that emits white light results even in the black display state. In contrast, using the alignment film of the present invention, the alignments are continuous even in regions such as below slit 111, and poor alignments are suppressed. Moreover, vertical alignment is maintained even if a lot of ultraviolet light is irradiated from the front, and fluctuations in the pretilt angles are small even if there are fluctuations in the amount of irradiated ultraviolet light.

A second embodiment of the present invention will now be explained with reference to FIGS. 10A and 10B.

As shown in FIG. 10A, the alignment of the liquid crystal layer 112 of the second embodiment is controlled to be in the same direction as alignment control by the electric field leaking from the gate electrodes 113. In particular, the oblique electric field from the gate electrode or data electrode assists in the orientation. Consequently, the alignments near the gate electrodes 115 change continuously and disclinations do not develop. However, when the tilt of the liquid crystal in FIG. 10A is reversed, disclinations develop near region 114a. See, FIG. 10B. In other words, if the orientations are controlled to oppose the orientations caused by the oblique electric field from the gate electrode or data electrode, disclinations will develop. In contrast, according to in this embodiment, the alignment is controlled over the entire display electrode surface because photo-alignment is used. Consequently, response is fast in this embodiment, and disclinations do not occur.

In this display shown in FIGS. 10A and 10B, the inclination of the side surface of rib-shaped part 116 is used to control the alignment of the liquid crystal. If only the rib-shaped part 116 is used, the gap with an adjacent rib-shaped part 116 must be narrower. For example, a gap around 30 $\mu$m is preferred. In this case, however, the rib-shaped parts are often present in the display pixels.

In this embodiment, the gaps between the rib-shaped parts can be widened because they in combination with the photo-alignment. During photo-alignment, the rib-shaped parts do not necessarily have to have an active alignment control force. Alignment by photo-alignment provides the possibility of not determining with certainty the position in the center part shown in FIG. 10A. For example, if the width of the slit in the optical mask is about 20 $\mu$m, the center of the domain is believed to be difficult to reliably bring to the center of the slit. The positions of the divisions in this domain are reliably set by forming the rib and the rib-shaped part plays a major role in this embodiment.

As described above, the alignment film for photo-alignment is preferably a vertically or horizontally aligned polyimide, polyamic acid, or crosslinked resin film (for example, polyvinyl cinnamate). As will be appreciated by one of ordinary skill in the art, the materials are not limited to those listed above. Moreover, the alignment need not be limited to vertical and horizontal alignments.

According to a preferred embodiment, the structure includes vertically aligned polyimide. Specifically, the alignment of the polyimide is preferably vertical in an initial state. Moreover, the liquid crystal provided between the alignment films preferably have negative dielectric anisotropy, particularly a fluorine liquid crystal. In addition, the material of the rib-shaped part is a positive photoresist.

The liquid crystal panel structure shown in FIG. 10A includes a rib-shaped part 116 in addition to the above-described alignment film. The rib-shaped part 16 assists in producing the two domains. As a basic structure, this idea may also applied to producing four domains. The liquid crystal molecules in the liquid crystal layer 114 are set to tilt from the upper and lower gate electrodes 113 of the pixel electrode 118 towards the center of the pixel, or (and) the liquid crystal molecules are set to tilt from the left and right data electrodes 115 of the pixel electrode 118 towards the center of the pixel.

A slit 111 (not illustrated in FIG. 10A, see, FIG. 11) in the optical mask 102 on the TFT substrate 104a side is provided at the center of the pixel and ultraviolet light is irradiated. Similarly, ultraviolet light is irradiated at an incline on the opposing CP side substrate 104b. The resin rib-shaped part 116 can be provided on the TFT substrate 104a and/or the CF substrate 104b to assist in controlling the alignment direction.

FIGS. 11A and 11B depict the light source used in the alignment process of the present invention. FIG. 11A is a cross-sectional view along the lengthwise direction of the lamp, and FIG. 11B is a cross-sectional view along the widthwise direction of the lamp.

The lamp 121 shown in FIG. 11B is preferably low-pressure mercury lamp manufactured by Ushio Denki Co., Ltd., a shielding plate 122 is disposed between the tubular ultraviolet lamp 121 and the exposure target surface of the alignment film 103 to prevent the light from directly reaching the exposure target. A so-called cold mirror 123 that does not reflect infrared light is disposed at the back surface.

The lamp structure shown in FIG. 11A, irradiates ultraviolet light perpendicular to the optical mask 102 in the widthwise direction of the lamp 121. The perpendicular irradiation directions to the ultraviolet light tube are nearly perpendicular to the substrate (FIG. 11A). However, the parallel irradiation directions to the ultraviolet light tube are random (FIG. 11B). The slit 111 in the optical mask 2 and the lamp 121 are arranged orthogonal to each other. Light from the slit 111 exposes the alignment film 103 at an incline in the form of leaks in the widthwise direction of the slit 111.

Figure 12:
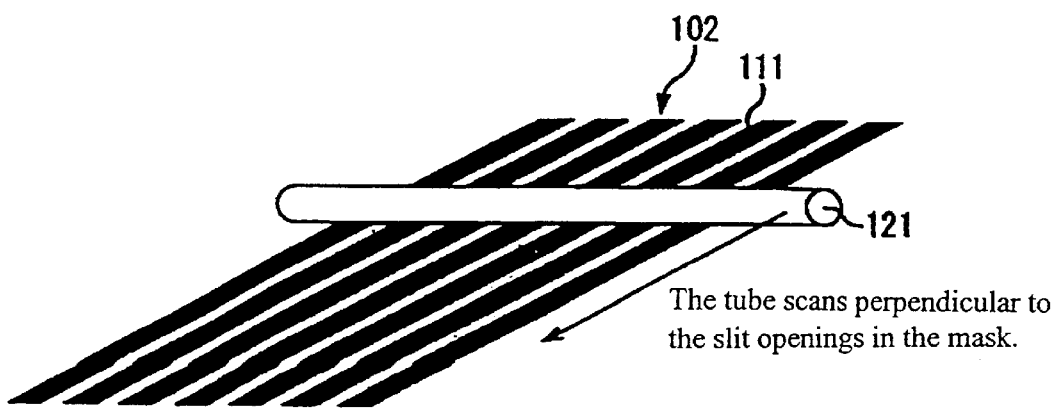
FIG. 12 is a diagram showing the light source of FIG. 11 scanning an optical mask.

As shown in FIG. 12, the lamp 121 is caused to scan the slit 111 (while being maintained perpendicular to the slit 111) so as to uniformly expose the entire alignment film 3 with scattered light. The tube scans perpendicular to the slit openings in the mask. As will be appreciated by one of ordinary skill in the art, other lamp structures may be used, without departing from the scope of the present invention. For example, the installation direction of the lamp 121 may be at 90°. Moreover, it is possible to remove the shielding plate 122 disposed directly below the lamp 121 to allow the ultraviolet light directed toward the surface of the alignment film 103 to be actively used while the scattered light is directly irradiated from the lamp 121. However, by combining the shielding plate 122 and the cold mirror 123 of this embodiment, there is less possibility of light being irradiated in a different direction than the direction perpendicular to the desired direction for tilting the liquid crystal molecules, that is the elongated direction of the slit 111. In addition, alignment is more stable and reliable.

When light enters from the slit 111, either polarized light or non-polarized light is acceptable, but if the alignment film arranged in the perpendicular direction is used, non-polarized light can be used. The light irradiation method is proximity exposure because the light flows in and irradiates. The distance between the optical mask 102 and the alignment film 103 is preferably several $\mu$m to 100 $\mu$m. If outside of this range, the inflow of light is inadequate, and negative effects such as not obtaining the alignment and difficulty in specifying the boundaries of the domains may result.

The width of the slit 111 in the optical mask 102 is preferably several $\mu$m to around 100 $\mu$m. If outside of this range, the incoming light is similarly inadequate, and negative effects such as poor alignment and difficulty in specifying the boundaries of the domains may result. The domains in this embodiment are described using examples applied to a TFT LCD.

Figure 11:
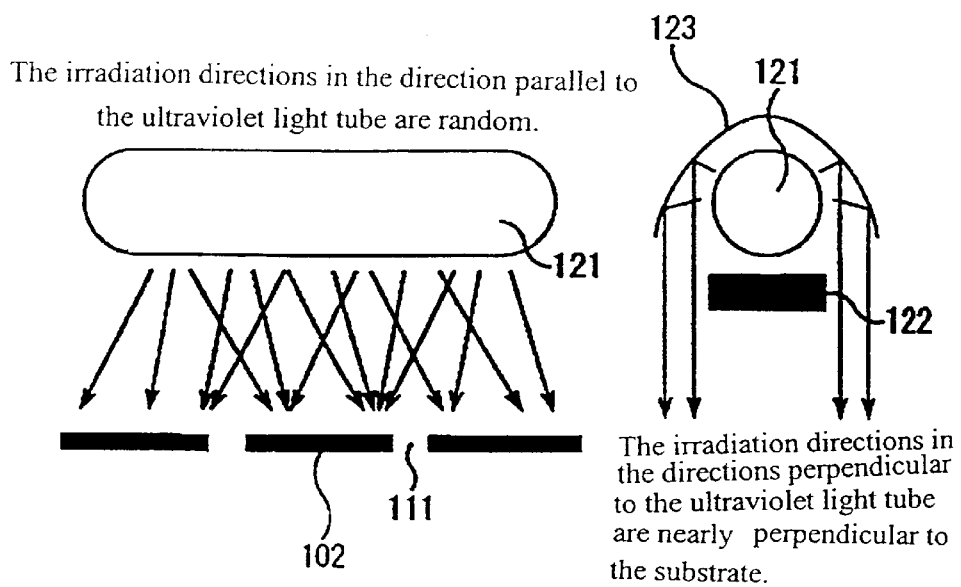
FIG. 11 is a schematic diagram showing the structure of the light source used in FIG. 7.
Figure 13A:
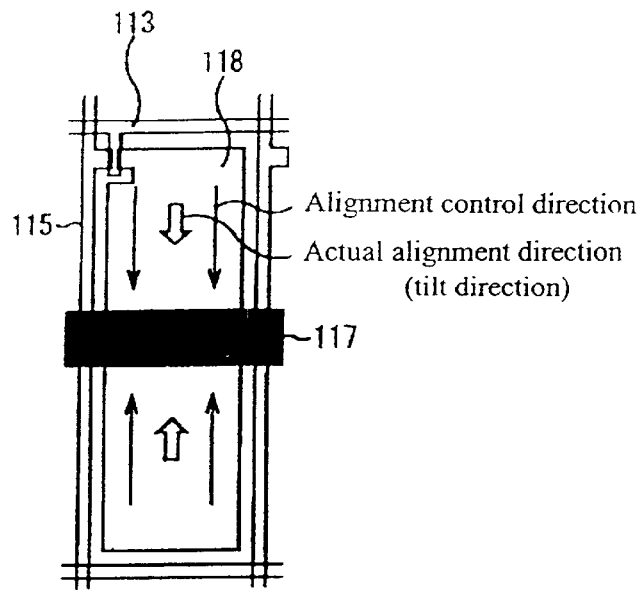
FIGS. 13A–13C are schematic diagrams of a TFT LCD having top and bottom domains.
Figure 13B:
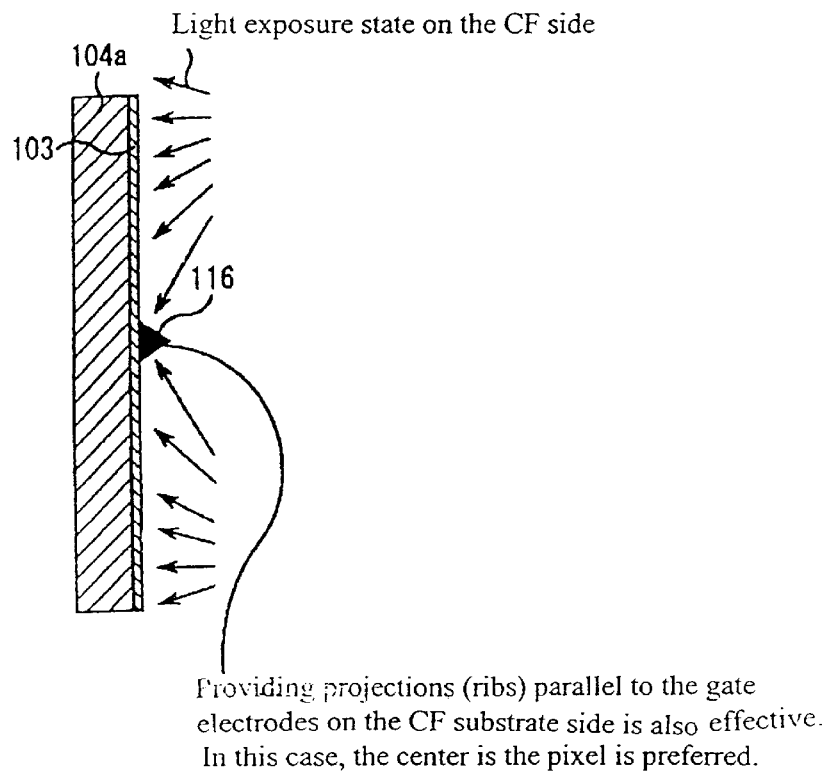
Figure 13C:
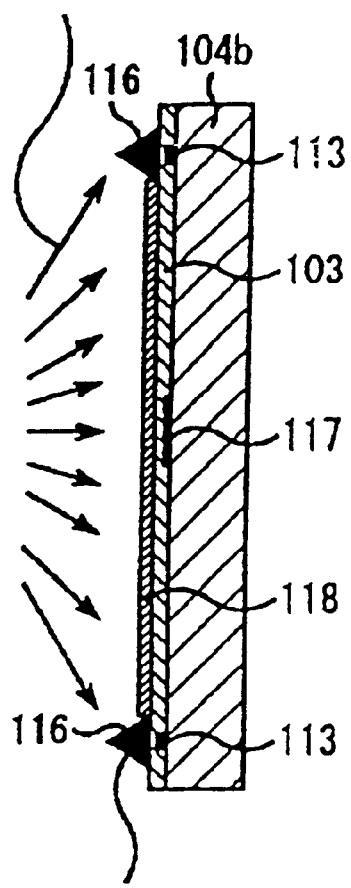

FIGS. 13A, 13B and 13C show one example of a TFT LCD having two domains on the top and bottom alignment films. It should be appreciated that the lamp structure depicted in FIGS. 11A–12 is used to provide UV irradiation, and reference to slit 111 is understood to refer to the slit 111 in FIGS. 11A–12. FIG. 13A is an enlarged view near the pixel electrode. FIG. 13B is a cross-sectional view when aligning on the CF substrate side. FIG. 13C is a cross-sectional view when aligning on the TFT substrate side.

In FIG. 13B, the slit 111 is provided parallel to and close to the gate electrode 113 and irradiates ultraviolet light on the CF substrate 104b. In FIG. 13C, the slit 111 is provided at the position that coincides with the Cs electrode 117 and is parallel to the storage capacitive (Cs) electrode 117 (gate electrode 113) and irradiates ultraviolet light on the TFT substrate 104a. In both FIGS. 13A and 13B, the scattered light is irradiated so that liquid crystal molecules tilt in the direction from the gate electrodes 113 of the TFT substrate 104a to the vertical center of the pixel electrode 118 of the CF substrate 104b.

In addition, the rib-shaped part 116 may be provided and is effective when installed parallel to the gate electrode 113 (CS electrode 117) near the center of the pixel electrode 118 on the CF substrate 104b side. Alternatively, the rib-shaped part 116 may be installed parallel to the gate electrode 113 (Cs electrode 117) at the position nearly coinciding with the gate electrode 113 on the TFT substrate 104a side.

FIGS. 14A–14C showing one example of two domains on the left and right of a TFT LCD. It should be appreciated that the lamp structure depicted in FIGS. 11A–12 is used to provide UV irradiation, and reference to slit 111 is understood to refer to the slit 111 in FIGS. 11A–12. FIG. 14A is an enlarged top view of the vicinity of a pixel electrode. FIG. 14B is a cross-sectional view during alignment on the CF substrate side. FIG. 14C is a cross-sectional view during alignment on the TFT substrate side.

The slit 111 for ultraviolet light exposure on the CF substrate 104a side is positioned parallel to the data electrode 115 and almost coincides with the position of the data electrode 115 and transmits scattered UV light. On the TFT substrate 104b side, the slit 111 is positioned parallel to the data electrode 115 at the horizontal center of the pixel electrode 118 and transmits scattered UV light. Therefore, the liquid crystal molecules are oriented to tilt from the data electrodes 115 on the TFT substrate 104b to the horizontal center of the pixel electrode 118 of the CF substrate 104a. This coincides with the alignment direction due to the oblique leaking electric field from the data electrodes 115. The alignment may further be stabilized by fixing the positions of the occurrences of disclinations at the alignment boundaries using the rib-shaped parts 116.

As best seen in FIG. 14C, the rib-shaped part 116 may be provided to run vertically along the center of the pixel electrode 118 on the CF substrate 104a side, parallel to the data electrodes 115 at the positions that nearly coincide with the data electrodes 115 on the TFT substrate 104b side.

Figure 15A:
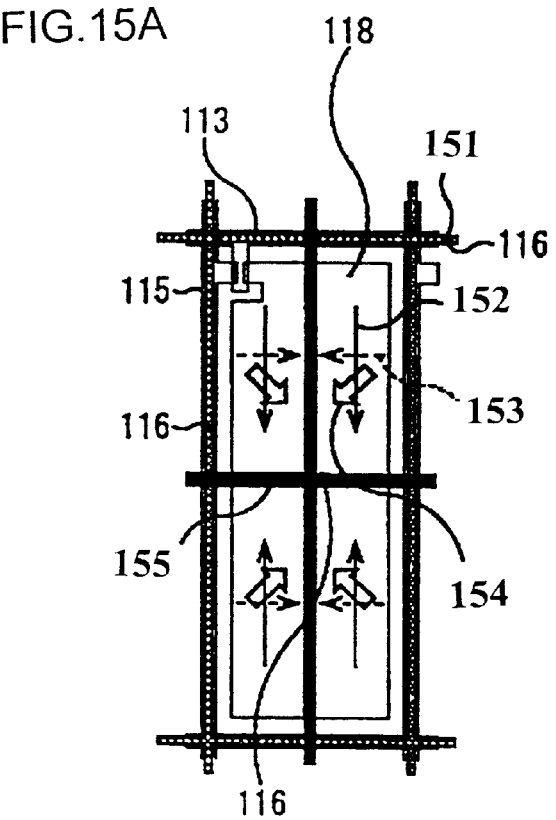
FIGS. 15A–15C are schematic diagrams of a TFT LCD having top, bottom, left, and right domains.

FIGS. 15A–16C are schematic drawings showing an example of four domains on the left, right, top, and bottom in a TFT LCD. FIG. 15A is an enlarged top view in the vicinity of a pixel electrode having the rib shaped element 116 formed on the TFT side, and a rib shaped projection 155 formed on the CF substrate side. The solid arrow 152 indicate the alignment direction of the TFT side, and dashed arrows 153 indicate the direction of falling on the CS side.

Moreover, arrows 154 indicate the tilt direction when voltage is applied to the liquid crystals.

Figure 15B:
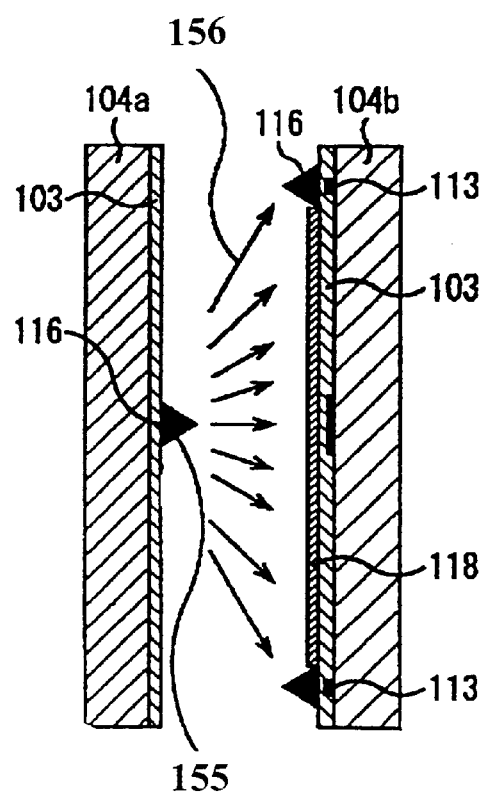
Figure 15C:
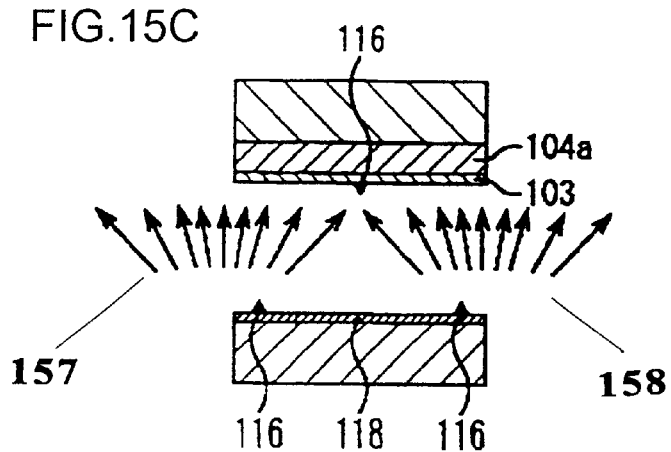

FIG. 15B is a cross-sectional view during alignment along a data electrode. FIG. 15C is a cross-sectional view during alignment along a gate electrode. The state of the ultra violet light irradiating the TFT substrate is generally designated 156. It should be appreciated that the lamp structure depicted in FIGS. 11A–12 is used to provide UV irradiation, and reference to slit 111 is understood to refer to the slit 111 in FIGS. 11A–12.

If the CF substrate 104a (FIG. 15B) is placed in the foreground of the paper, the tilt for any of the liquid crystal molecules in FIGS. 15A–16C is in the alignment direction in which the liquid crystal molecules fall from the four corners of the pixel electrode 118 of the TFT substrate 104b towards the center of the pixel electrode 118. Four domains are produced on the top, bottom, left, and right sides of the pixel electrode 118. On average, the liquid crystal molecules in the top right region are aligned to fall from the northeast to the southwest. Similarly, the tilts of the liquid crystal molecules are aligned to fall from the southeast to the northwest in the lower right, from the southwest to the northeast in the lower left, and from the northwest to the southeast in the upper left.

To make the liquid crystal molecules tilt at a 45° incline, the orientation on the CF substrate 104a side and the orientation on the TFT substrate 104b side have true directions at 90° so that the liquid crystal molecules fall towards the center in these two directions. The principle behind this alignment direction has been disclosed, for example, in the Digest of AM-LCD98. If the liquid crystal molecules tilt from the northeast to the southwest, the two methods considered are (1) a method that aligns the TFT substrate 104b side to fall towards the south and the CF substrate 104a side to fall towards the west, and (2) a method that aligns the TFT substrate 104b side to fall towards the west and the CF substrate 104a side to fall towards the south.

FIGS. 15A–15C show the alignment according to method (1). On the TFT substrate 104b side, the slit 111 in the optical mask for ultraviolet light exposure is provided close to and parallel to the Cs electrode 117 and irradiates scattered light (FIG. 15B). On the CF substrate 104a side, the slit 111 in the optical mask for ultraviolet light exposure is provided close to and parallel to the data electrode 115 (FIG. 15A) and irradiates scattered light.

As shown in FIG. 15C, it is effective to provide a rib-shaped part 116 on both the TFT substrate 104b and the CF substrate 104a. On the TFT substrate 104b side, the rib-shaped parts 116 are formed to be parallel to and close to the data electrode 115 and the gate electrode 113, respectively. Thus, they act to assist in creating four domains in the liquid crystal. On the CF substrate 104a side, the rib-shaped parts 116 are formed in a shape that extends vertically and horizontally from the center of the pixel electrode 118. As described earlier, the rib-shaped part acts to promote establishing the boundaries of the domain divisions.

Figure 16A:
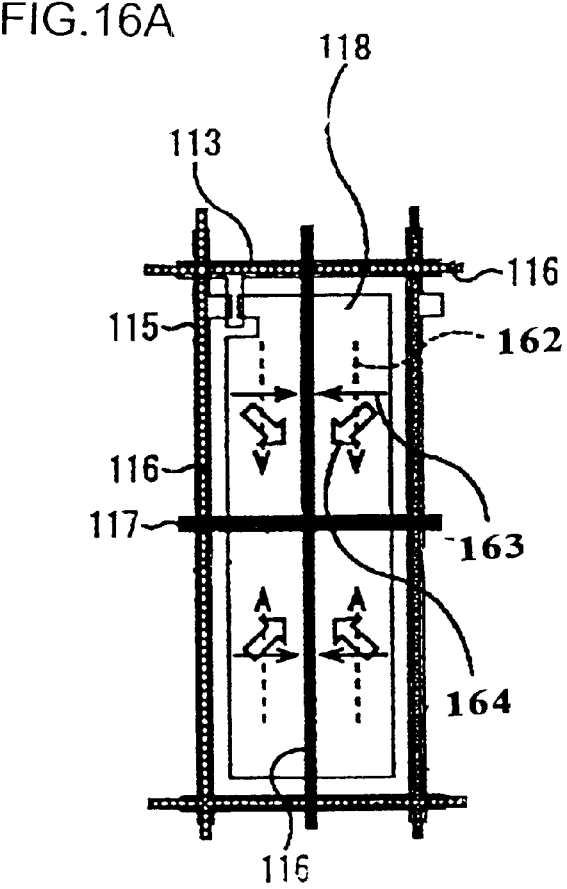
FIGS. 16A–16C are schematic diagrams of a TFT LCD having top, bottom, left, and right domains.
Figure 16B:
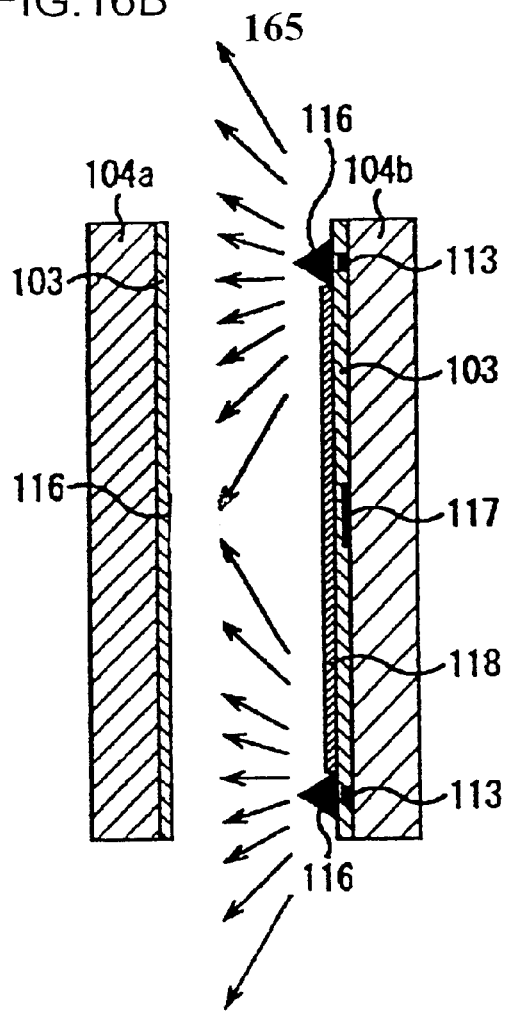
Figure 16C:
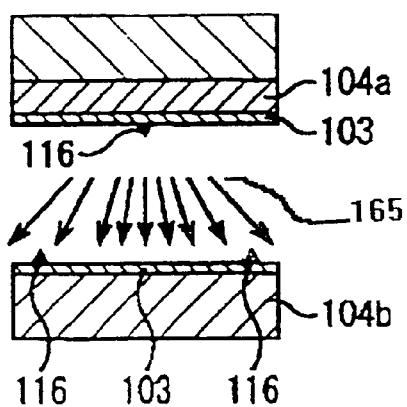

FIGS. 16A–16C show alignment according to method (2), in which a rib shaped element 116 is formed on both the TFT substrate 104b and CF substrate 104a. The solid arrow 163 indicate the alignment direction of the TFT side, and dashed arrows 162 indicate the tilt direction of the liquid crystals on the CF side. Moreover, arrows 164 indicate the tilt direction when voltage is applied to the liquid crystals.

On the CF substrate 104a side, the slit 111 in the optical mask for ultraviolet light exposure is provided close to and parallel to the gate electrode 113 and irradiates scattered light (FIG. 16B). The state of the ultraviolet light irradiating the CF substrate side is generally designated 165.

On the TFT substrate 104b side, the slit 111 in the optical mask for ultraviolet light exposure is provided parallel to the data electrode 115 near the horizontal center of the pixel electrode 118 (FIGS. 16A and 16B). The rib-shaped parts 116 are formed close to and parallel to the data electrode 115 and the gate electrode 113, respectively. Notably, the rib-shaped parts 116 assist in creating four domains in the liquid crystal. On the CF substrate 104a side, the rib-shaped parts 116 are formed in a shape that extends vertically and horizontally from the center of the pixel electrode 118. The state of the ultraviolet light irradiating the CF substrate side is generally designated 165 (FIG. 16C).

The surface energy of the alignment film in the pixel of the liquid crystal display device having domains reaches a maximum at a domain boundary and reaches a minimum at a position separated from the boundary. The reason is the ultraviolet light exposure differs in a pixel. The domain boundary is directly below the slit 111, and the surface energy reaches a maximum because most of the ultraviolet light irradiates this part. Because only leakage light irradiates the part separated from the boundary, the absolute amount of ultraviolet light exposure becomes smaller and the surface energy does not increase.

FIGS. 17A–17C shows a structure that suppresses disorder in the alignment caused by the lateral electric fields from the data electrodes using the rib-shaped part 116 installed on the CF substrate side when there are two domains, an upper and a lower domain, in a TFT LCD. The solid arrow 171 indicates the alignment control direction, and arrow 162 indicates the tilt direction of the liquid crystals.

FIG. 17A is an enlarged top view in the vicinity of a pixel electrode. FIG. 17B is a cross-sectional view during alignment along the data electrode (along line segment 17B—17B). FIG. 17C is a cross-sectional view during alignment along the gate electrode (along line segment 17C—17C in FIG. 17A).

As shown in FIG. 17A, on the CF substrate 104a side, the rib-shaped parts 116 are formed horizontally in the center of the pixel electrode 118 and parallel to the data electrodes 115 in the parts opposite the data electrodes 115. The effect of the rib-shaped part 116 installed parallel to this data electrode 115 is explained with reference to FIG. 17C. The liquid crystal molecules near the data electrode 115 have a tendency to tilt towards the center of the pixel due to the electric field from the data electrode 115. As shown by dashed portion 174 in FIG. 17C, the rib-shaped part 116 installed on the opposing CF substrate 104a tilt the liquid crystal molecules in the direction away from the pixel electrode 118. These effects cancel each other, and the liquid crystal molecules do not fall towards the center of the pixel but tilt uniformly in the vertical direction.

Figure 18:
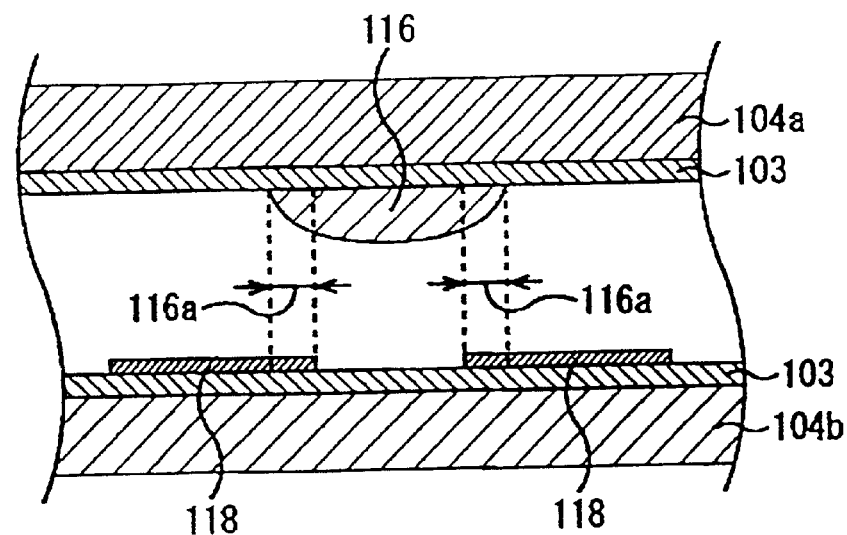
FIG. 18 is a cross-sectional view showing the relationship of the positions of the rib-shaped part and the pixel electrode.
Figure 19:
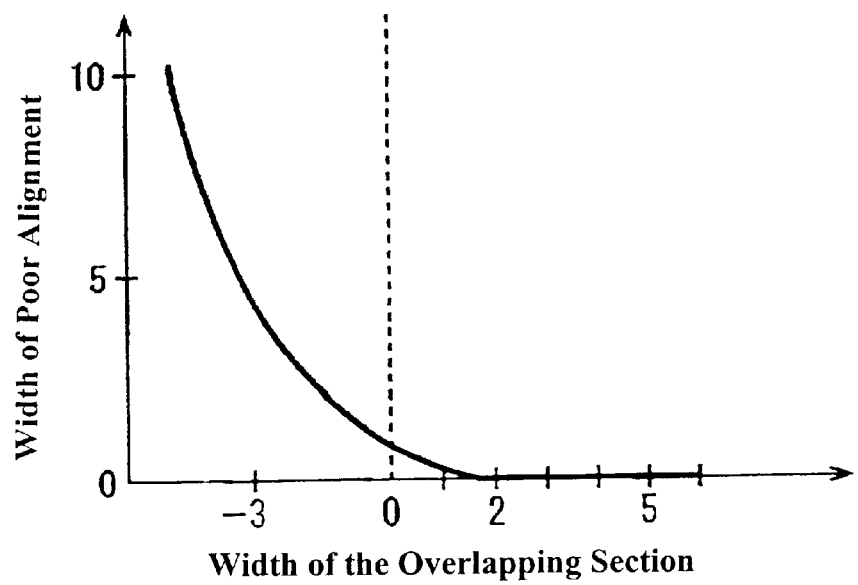
FIG. 19 is a characteristic plot showing the relationship between the width of the overlap of the rib-shaped part and the pixel electrode and the width of the poor alignment at the end of the pixel electrode.

As shown in FIG. 18, ends 116a of a rib-shaped part 116 opposite a gate electrode 115 are formed to be opposite to and partially overlap the ends of the pixel electrodes 118 of the TFT substrate 104b. FIG. 19 shows the relationship between the width of this overlapping part 116a and the width of a poor alignment at the end of a pixel electrode 118. In this case, by making the width of the overlapping part 116a at least 1 μm and more preferably 2 μm, the development of poor alignments can be suppressed. When the overlapping part 116a is actually formed, the mismatch is maintained around 3 μm and the width of the overlapping part 116a of at least 1 μm is reliably obtained. If the upper limit of the overlapping part 116a is set to 5 μm in order to not harm the function of the pixel electrode, the width is designed to be 1 µm (lower limit of the required width)+3 µm (mismatch) to 5 µm (upper limit of the required width)+3 µm (mismatch)=from at least 4 µm to no more than 8 µm or from at least 5 µm to no more than 8 µm. Therefore, the generation of poor alignments can be adequately prevented.

Figure 20A:
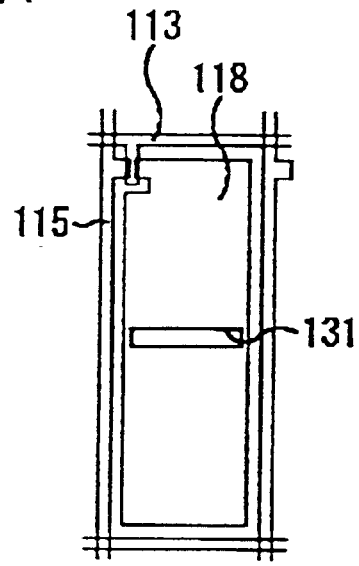
FIGS. 20A–C are schematic diagrams showing a modification of the TFT LCD of FIG. 13.
Figure 20B:
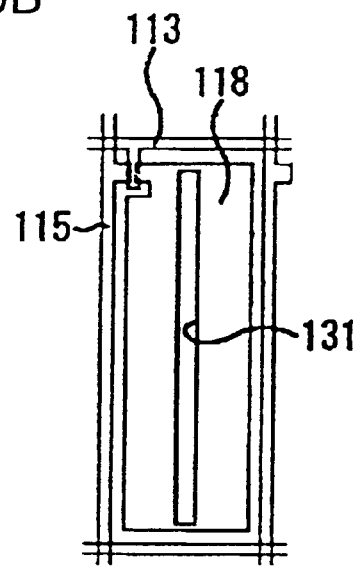
Figure 20C:
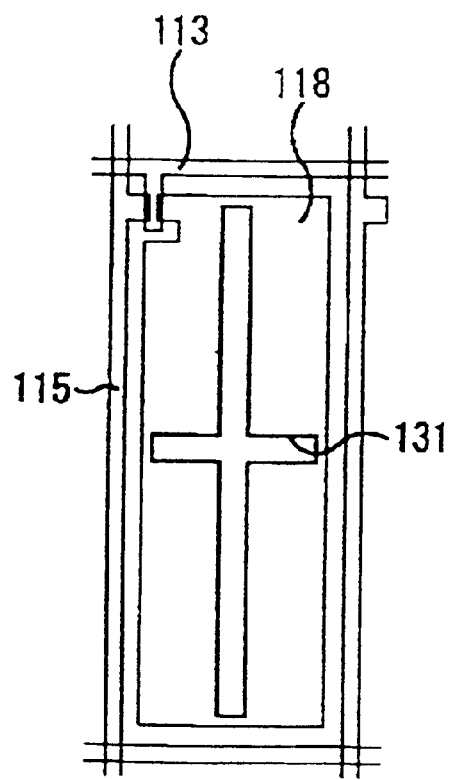

The structure forming the rib-shaped part 116 on the CF substrate 104a or the TFT substrate 104b has been described. However, similar results can be obtained without the rib-shaped parts 116 by removing slit shapes that are not part of the electrode in the pixel electrode 118. Notably, FIG. 20A corresponds to FIG. 13A when the slit-shaped notch 131 was formed parallel to the Cs electrode 117 (gate electrode 113) of the pixel electrode 118 and at the position coinciding with the Cs electrode 117. FIG. 20B corresponds to FIG. 14A when the slit-shaped notch 131 was formed in the pixel electrode 118 parallel to the data electrode 115 and at the position corresponding to the center of the pixel electrode 118. FIG. 20C corresponds to FIG. 15A when the slit-shaped notch 131 shaped as a cross was formed in the pixel electrode 118.

Figure 21:
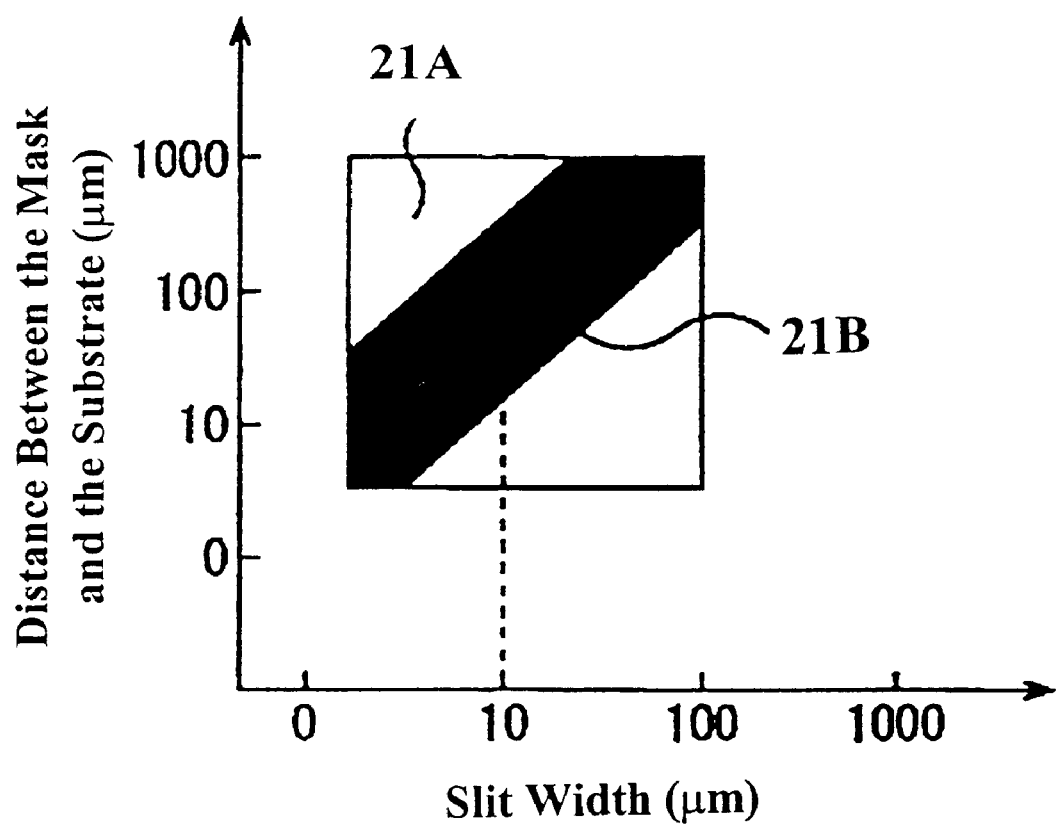
FIG. 21 is a characteristic plot showing optimum values for the width of the slit in the optical mask with a favorable alignment state and the distance between the optical mask and the substrate.

FIG. 21 is a characteristic plot showing the test results about the width of the slit 111 in the optical mask with an excellent alignment state and the optimum value of the distance (distance A) between the optical mask and the substrate. Excellent alignment can be obtained for a slit width from 3 µm to 100 µm (Region A) and a distance between the mask and the substrate from 3 µm to 100 µm. Furthermore, the preferred distance between the optical mask and the substrate is from 50 µm to 100 µm (Region 21B). The slit width and the distance A are nearly equal. Excellent alignment can be obtained when the slit width is set in the range from about the same value as distance A to about 1/20th of distance A.

According to this embodiment as described above, alignment using ultraviolet light is accurately performed in the minimum number of processes. A vertically aligned liquid crystal display device is implemented few disclinations in two or four domains. The result is the ability to produce a superior bright screen when using the TN mode. Furthermore, the response speed can provide high-speed responsiveness that is similar to or better than in a so-called MVA liquid crystal display device provided with many rib-shaped parts.

Figure 22:
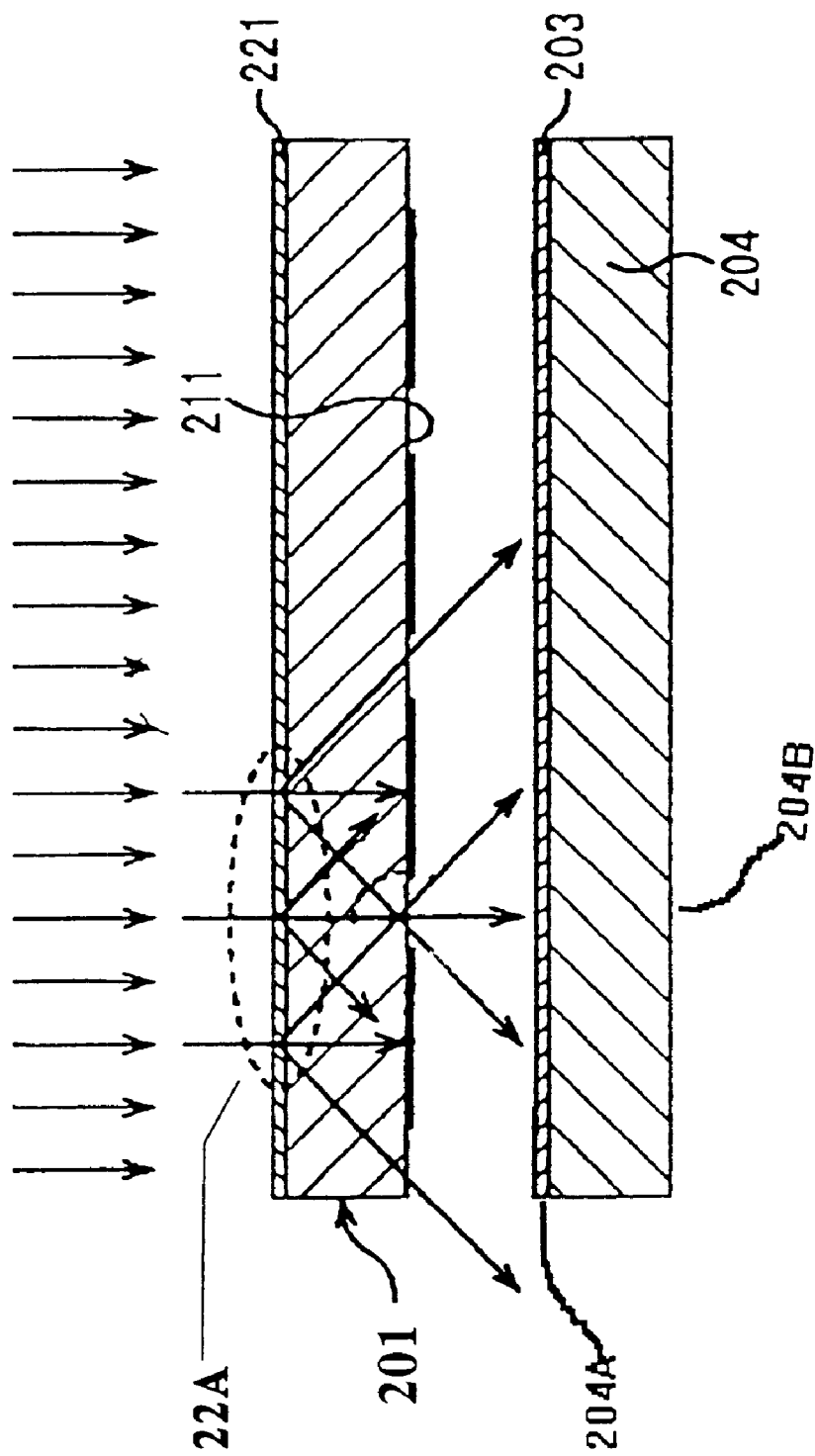
FIG. 22 is a cross-sectional view shows the important structures of the alignment apparatus according to a third embodiment.

FIG. 22 is a cross-sectional view of the main structures in the alignment apparatus of another embodiment.

In this embodiment, the alignment film is a copolymer of two polymers. Preferably, the alignment of one polymer changes from the initial vertical alignment in response to ultraviolet light exposure and assumes a constant value of approximately 90° when the ultraviolet light exposure exceeds some level. The other polymer has the property of starting to change the pretilt angles from the vertical alignment in response to ultraviolet light exposure, and returning again to the vertical alignment when exposed again to ultraviolet light.

Quartz glass which is transparent in the short wavelength region (for example, 254 nm) of the ultraviolet light is preferably used for the optical mask 201. A mask pattern of metallic chromium is formed on one side of the optical mask 201. The mask pattern provides a stripe-shaped slit 211 in the metallic chromium. The stripe-shaped slits 211 are lined up at the same pitch as the pitch of the pixels having domains. As one example, if the pixel pitch is 200 µm, the width of a slit 211 is 10 µm, and the width of the metallic chromium pattern becomes 190 µm from one slit 211 to the adjacent slit 211.

The scattering mechanism 221 that scatters parallel light is formed on the surface of the optical mask 201 on the light source side. Scattering of the incident light is generally shown by the dashed circle 22a. The scattering mechanism 221 may be formed, for example, by sandblasting the surface of the optical mask 201 on the light source side.

The alignment film 203 is irradiated with ultraviolet light on the glass substrate 202. The optical mask 201 is placed so that the position of the stripe-shaped slot 211 almost coincides with the horizontal center position of the pixel and parallel to the data electrode.

The optical mask 201 is placed in the direction parallel to the data electrode with the position of the stripe-shaped slit 211 at the position of the data electrode of the TFT substrate 204B in the opposing substrate 204A when ultraviolet light irradiates the opposing substrate (CF substrate) 204A side.

After the optical mask 201 is disposed as described above, parallel ultraviolet light is irradiated perpendicular to the surface of the optical mask 201 on the light source side. The irradiated ultraviolet light is scattered by the ground glass part and is split into two directions with the center as the boundary from the slit 211 and irradiated as illustrated.

When the TFT substrate 204B is affixed to the opposing substrate 204A, the positions of corresponding slits become the centers of the pitch lining up the slits. Therefore, the region inclined in the direction perpendicular to the slit can be between the slit on the TFT substrate 204B side and the slit on the opposite substrate 204A side, that is within a 90 µm width. The domains in two orientations can be produced in one pixel by giving the orientations mutually opposite directions with the position of the slit in the center of the pixel as the boundary.

Figure 23:
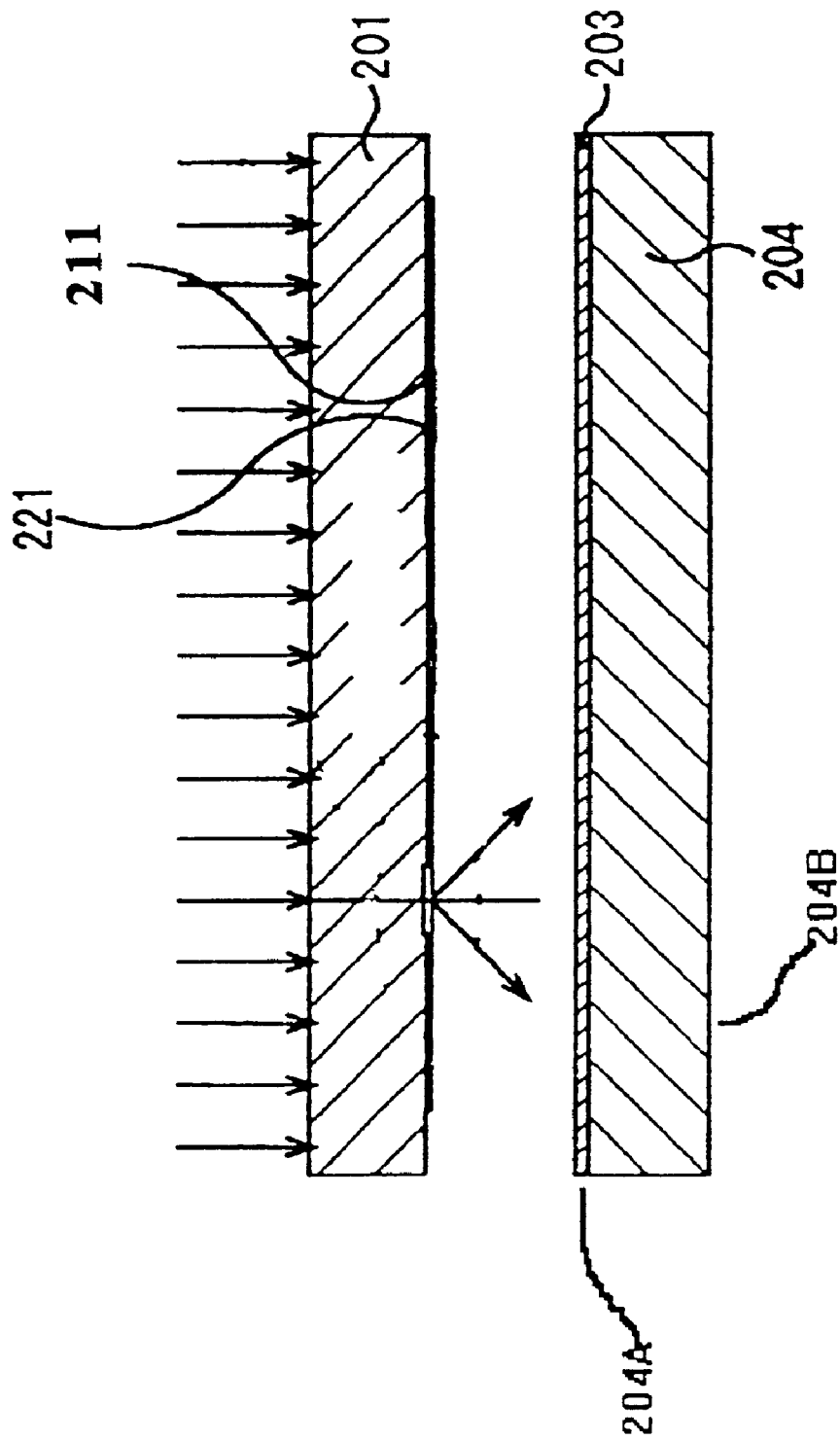
FIG. 23 is a cross-sectional view showing a first modification of the structure shown in FIG. 22.

FIG. 23 is a cross-sectional view showing another example of this embodiment. The optical mask 201 is disposed as described above and irradiates parallel ultraviolet light perpendicular to the surface of the optical mask 201 on the light source side. Irradiated ultraviolet light is scattered in two directions by the slit 211, and exposes the alignment film 203.

If the TFT substrate 204B is affixed to the opposing substrate 204A, the positions of their mutual slits are at the centers of the pitch lining up the slits. Thus, the region inclined in the direction perpendicular to the slit can be between the slit on the TFT substrate 204B side and the slit on the opposing substrate 204A side, that is within a 90 µm width. Domains in two directions can be produced in one pixel by giving the orientations mutually opposite directions with the position of the slit in the center of the pixel as the boundary.

Figure 24:
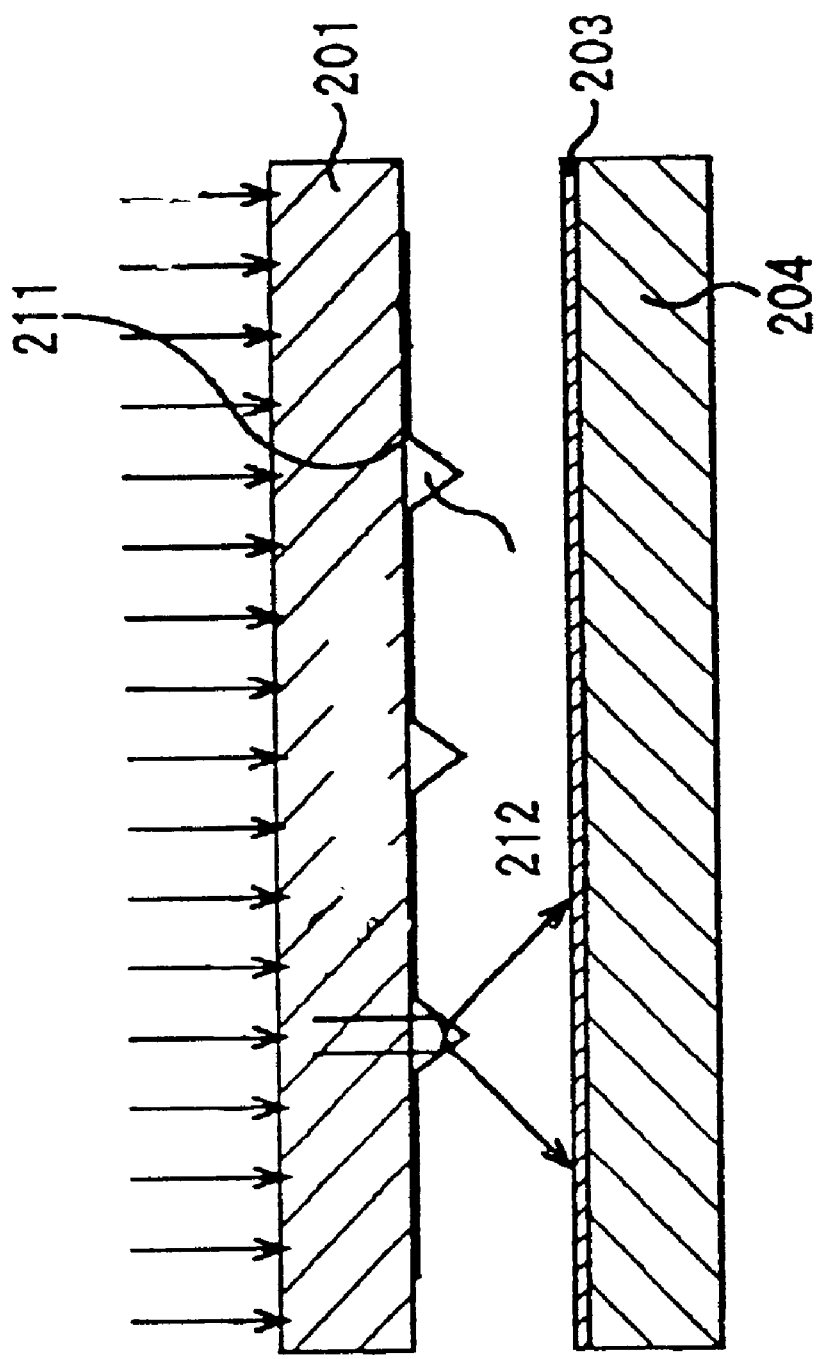
FIG. 24 is a cross-sectional view showing a second modification of the structure shown in FIG. 22.

FIG. 24 is a cross-sectional view showing another example of this embodiment.

A prism 212 generally shaped like an isosceles triangle with the width of the slit opening as its base is disposed in the opening of the slit 211 in the optical mask 201 described above.

Similar to the above description, the position of the optical mask 201 is perpendicular to the surface of the optical mask 201 on the light source side and irradiates parallel ultraviolet light. The irradiated ultraviolet light is reflected and refracted by the prism 212 and is split into parallel light in two directions when the scattered light is emitted from the prism 212 as shown in the drawing and exposes the alignment film 203.

If the TFT substrate 204B is affixed to the opposing substrate 204A, the positions of their mutual slits are at the centers of the pitch lining up the slits. Therefore, the region inclined in the direction perpendicular to the slit can be between the slit on the TFT substrate 204B side and the slit on the opposing substrate 204A side, that is within a 90 μm width. Domains in two directions can be produced in one pixel by producing orientations having mutually opposite directions with the position of the slit in the center of the pixel as the boundary.

Even if the ultraviolet light that exposes the surface of the optical mask 201 on the light source side is scattered light in this embodiment, similar to when parallel light is irradiated, the ultraviolet light exposing the alignment film 203 can be split in two directions to produce the desired domains. This method disperses the ultraviolet light that exposes the alignment film 203 directly below the slit, and the ultraviolet light exposure on this part no longer becomes excessive. In addition, domains can be produced by one exposure on one substrate.

As described above, even if the ultraviolet light on the optical mask 201 is parallel light, similar effects can be obtained when scattered ultraviolet light irradiates the optical mask 201 by scattering, or reflection or refraction by the ground glass part of the optical mask 201 or the prism 212. This shows that an ultraviolet light exposure device that emits parallel light as the light source can be used.

Because the ultraviolet light can be dispersed in the part of the alignment film 203 in the opening of the slit 211, excess exposure light in this part can be prevented. And void areas caused by a lower tilt in this part and flow-induced orientations can be prevented.

Embodiment 4

Figure 26:
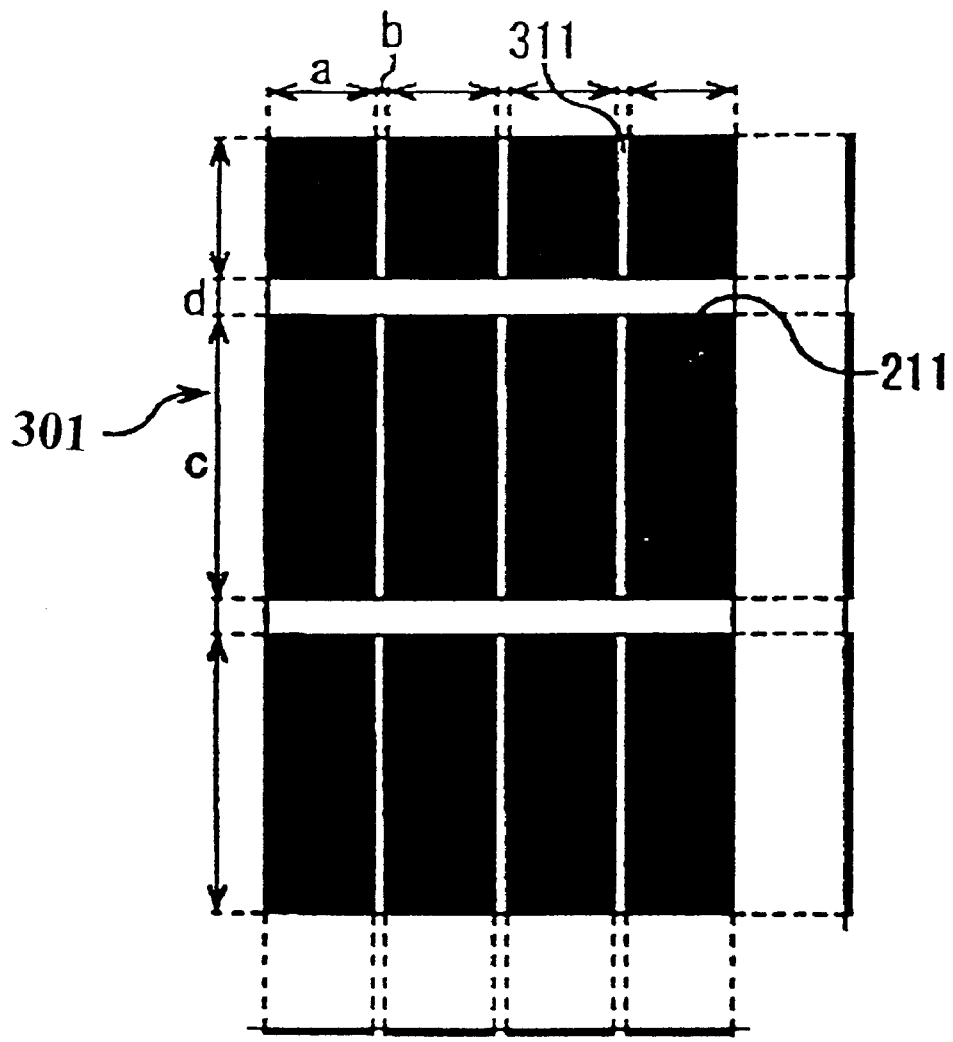
FIG. 26 is an oblique projection view showing the optical mask in the alignment apparatus.

Yet another embodiment will be explained with reference to FIGS. 25A–26.

Similar to the second embodiment, the alignment film in this embodiment is composed of two polymers. Preferably, alignment of one polymer changes from an initial vertical alignment in response to ultraviolet light exposure, and assumes a constant value near 90° when a predetermined level of ultraviolet light exposure is exceeded. The alignment of the other polymer starts to change from the vertical alignment in response to ultraviolet light exposure, but returns to the vertical alignment when exposed again to ultraviolet light.

FIG. 25A is a cross-sectional view of the main structures in the alignment apparatus in this embodiment. FIG. 25B is a cross-sectional view of the main structures in the liquid crystal display device implementing this alignment method. In FIGS. 25A and 25B, the liquid crystal molecule is generally designated 251.

Quartz glass that has the property of transmitting the short wavelength region (for example, 254 nm) of ultraviolet light is the material of the optical mask 301. As shown in FIG. 26, a mask pattern made of metallic chromium is formed on one surface of the optical mask 301. The mask pattern is provided with a stripe-shaped alignment control slit 211 in the metallic chromium. The alignment control slit 211 orients the liquid crystal molecules in the desired direction, and is lined up at the same pitch as that of the pixels having domains. As an example, if the pixel pitch is 200 μm, then the width of the slit 211 is 10 μm and the width of the metallic chromium mask pattern from a slit to an adjacent slit 211 becomes 190 μm.

Furthermore, an alignment correction slit 311 is provided in the same optical mask 311. This slit must be finer than the slit that orients the liquid crystal molecules in the desired direction and must be disposed in a mutually perpendicular direction. The pixel pitch is about one-third at 70 μm, and the width of the slit 311 is about 1 μm.

Figure 27:
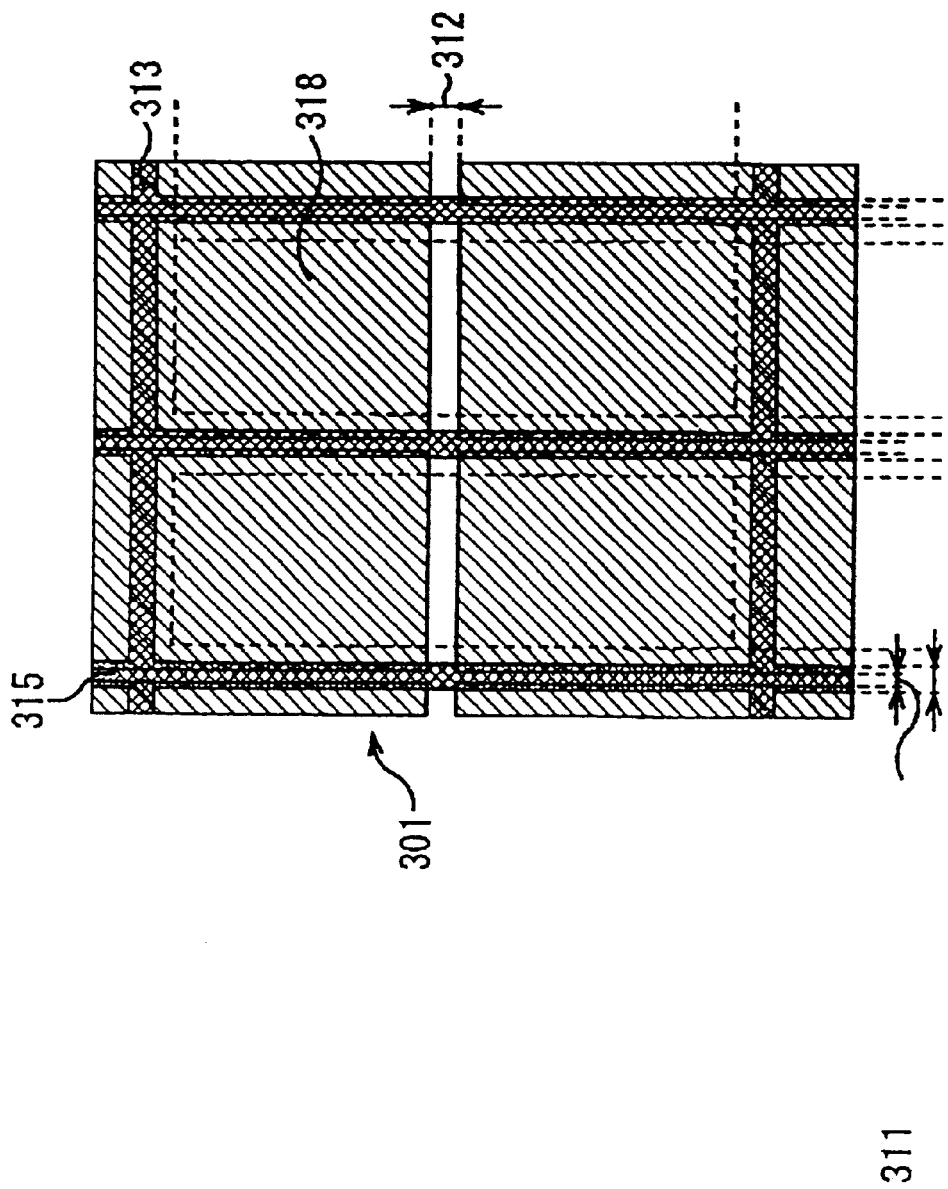
FIG. 27 is an oblique projection view showing the placement state of the optical mask.

Next, ultraviolet light irradiates the alignment film 303 on the glass substrate 304. As shown in FIG. 27, the optical mask 301 is placed so that the position of the alignment control slit 211 almost coincides with the center position horizontally of the pixel and is perpendicular to the data electrode 315 when ultraviolet light irradiates the TFT substrate 304b side. The positions of the alignment correction slits 311 are parallel to the data electrodes 315 and centered between adjacent pixel electrodes 318, that is they are at the centers of the data electrodes 315.

The optical mask 301 only needs the alignment control slit 211 when ultraviolet light irradiates the opposite substrate 304a side. The position of this slit 211 is the position of the gate electrode 313 of the TFT substrate 304b in the opposite substrate 304a and is disposed in the direction perpendicular to the data electrode 315.

After the optical mask 301 is disposed as described above, scattered ultraviolet light is irradiated perpendicular to the surface of the optical mask 301 on the light source side. As shown in FIG. 25A, the irradiated ultraviolet light is split into two directions by the slit 311.

The ultraviolet light irradiates through the slit 311, and spreads out in a fan shape centered on the slit 311. As shown in FIG. 25, the alignment control force that tilts the liquid crystal molecules in some direction of the slit 311 is applied to the alignment film 303. Thus, the directions of the force that orients the liquid crystal molecules by the electric field at the ends of the pixel electrode 318 and the alignment control force of the alignment film 303 oppose each other in order to cancel the forces that orient the liquid crystals, tilting the liquid crystal molecules perpendicular to the direction of the desired tilts of the liquid crystal molecules can be prevented.

Figure 28:
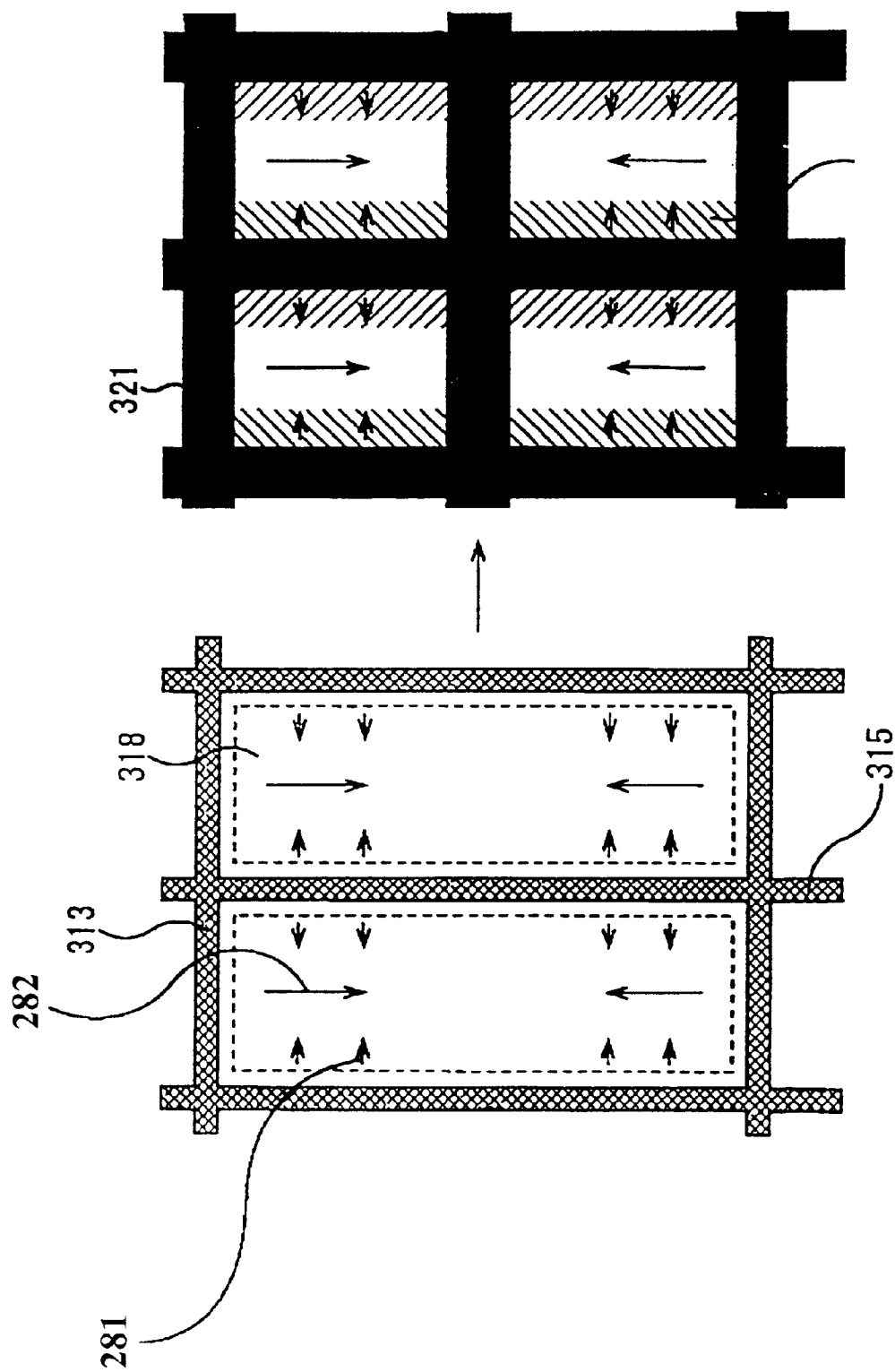
FIGS. 28A and 28B are top views showing the image state in the liquid crystal display device according to the fourth embodiment.

The brightness changes in the image display device (device A) that implements the alignment correction in addition to the alignment control of two divisions by the method of this embodiment is examined based on a comparison with the image display device (device B) that implements only alignment control for two divisions. In device B (FIG. 28A), the tilt of the liquid crystal molecules by the electric fields at the ends of the pixel electrodes 318 is generally designated 281. The desired orientation of the liquid crystal molecules is generally designated 282. Moreover, regions where brightness reductions occur at the ends of the black matrix 321 are generally designated 281 in FIG. 28B.

Figure 29:
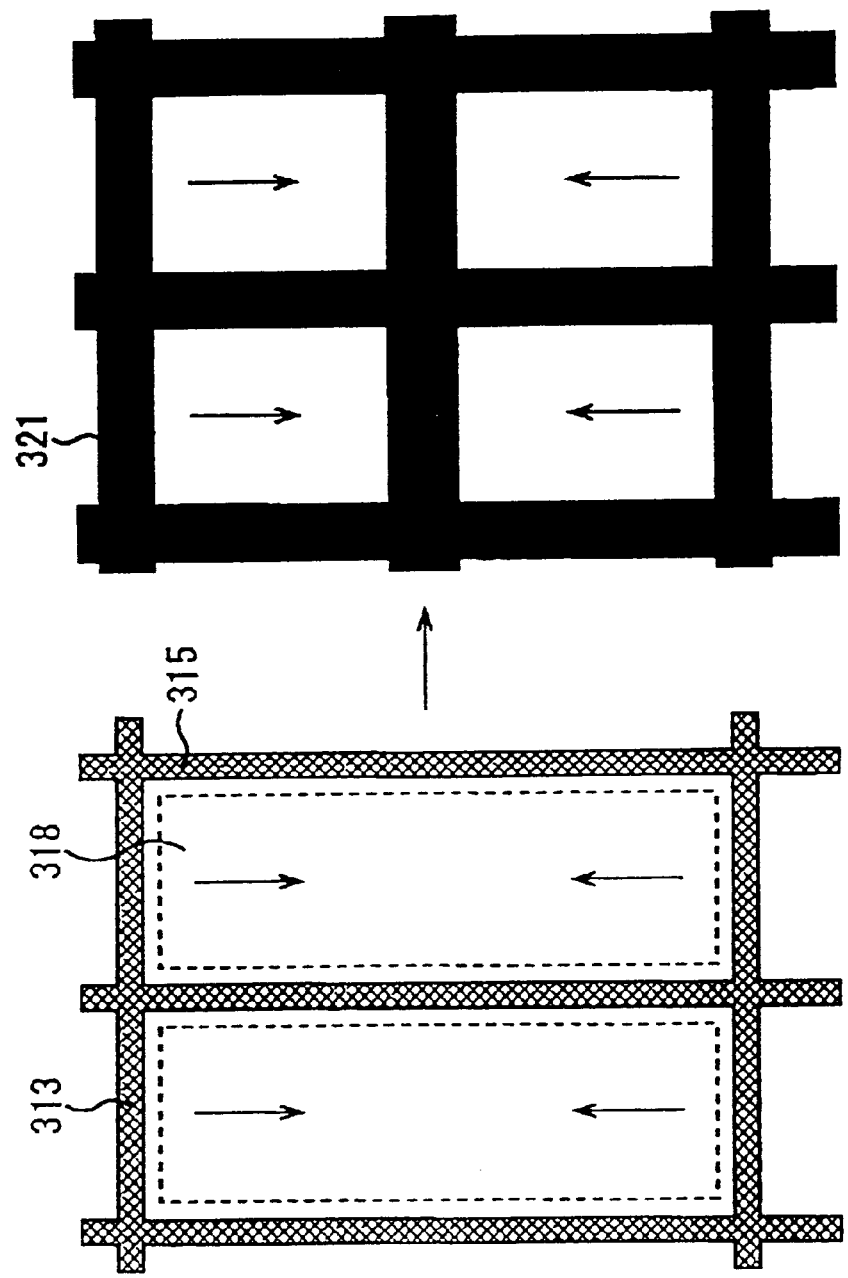
FIGS. 29A and 29B are top views showing the image state of the liquid crystal display device using only alignment control for two divisions.

In contrast, the tilts of the liquid crystal molecules are eliminated at the ends of the pixel electrodes 318 in FIG. 29A (Device A). Consequently, an excellent image is obtained without the problem of lower brightness regions at the ends of the black matrix 321.

If the TFT substrate 304b is affixed to the opposing substrate 304a, the positions of their mutual slits are at the centers of the pitch lining up the slits. The region that inclines in the direction perpendicular to the slit can be between the slit on the TFT substrate 304b side and the slit on the opposing substrate 304a side, that is within a 90 μm width. Domains in two directions can be produced in one pixel by producing orientations having mutually opposite directions with the position of the slit in the center of the pixel electrode 318 as the boundary.

Figure 30:
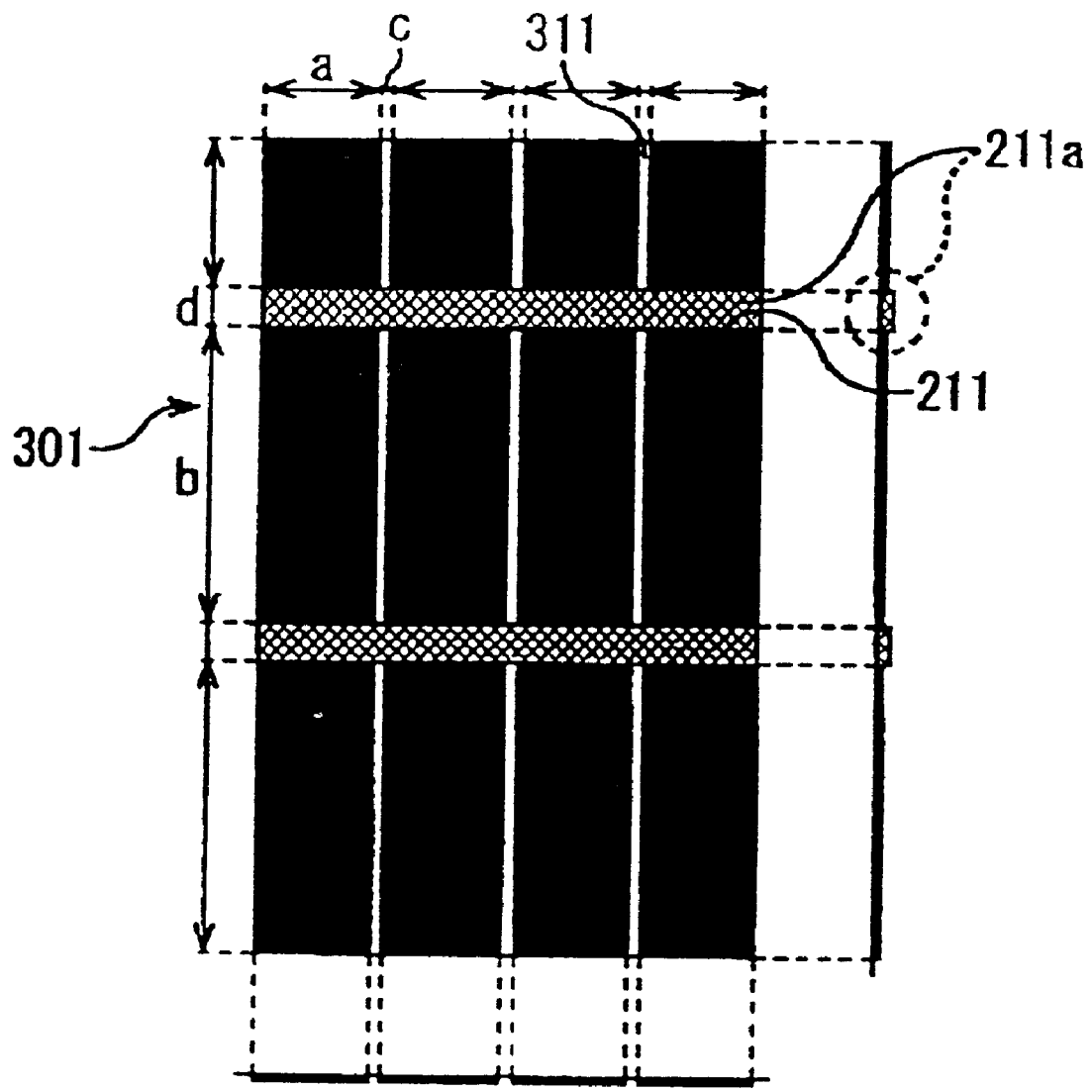
FIG. 30 is an oblique projection view showing the optical mask in the alignment apparatus according to a first modification.

FIG. 30 is a top view of the optical mask in another example of this embodiment. Although similar to the above description up to forming the slit in the optical mask, the scattering mechanism for the incident ultraviolet light is provided on the surface on the side opposite the alignment film 303 of the slit 211 that orients the liquid crystal molecules in the desired direction. As a specific example of the scattering mechanism, a groove with a depression-shaped cross-section is provided by sandblasting only the opening of the slit 211, forming the ground glass part 211a, or irradiating with laser pulses.

The irradiated ultraviolet light is scattered by the ground glass part 211a and has its irradiation width narrowed by the alignment correction slit 211, so it does not negatively affect the essential orientations of the liquid crystal molecules.

Figure 31:
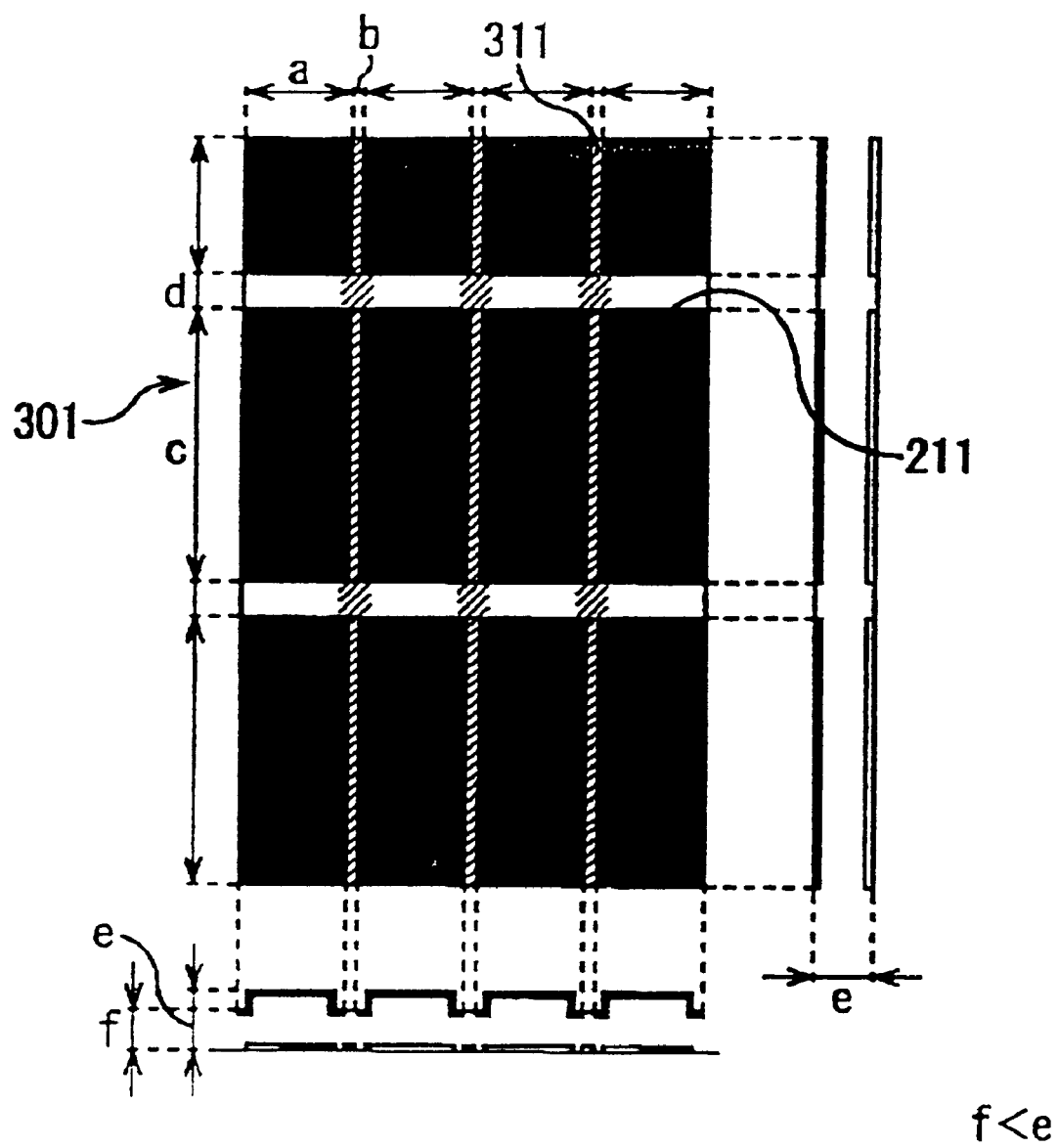
FIG. 31 is an oblique projection view showing the optical mask in the alignment apparatus according to a second modification.

FIG. 31 is a top view of the optical mask in another example of this embodiment.

Only the alignment correction slit 311 in the optical mask 301 has a prescribed height, for example, it is formed to be about 50 µm. Therefore, the gap between the optical mask 301 and alignment film 304, which are opposite each other, becomes narrower to around 50 µm only in the alignment correction slit 311 and can narrow the width of the scattered ultraviolet light incident on only this part. Thus, the essential orientations of the liquid crystal molecules are not negatively affected.

Figure 32B:
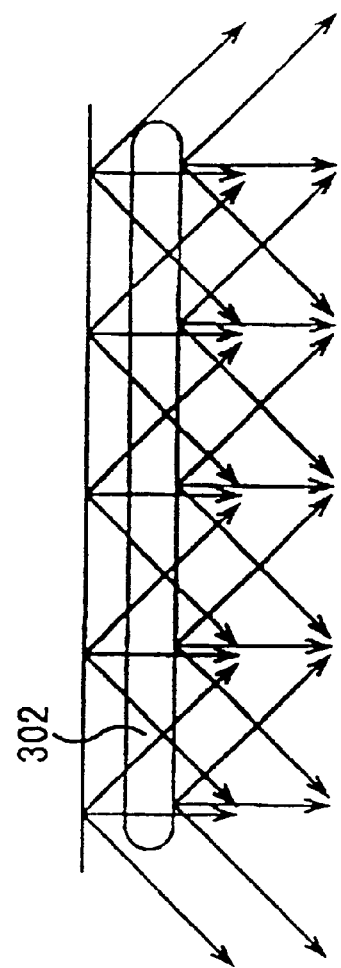
FIGS. 32A and 32B are schematic diagrams of the light source used in the alignment apparatus of FIGS. 25A and 25B.
Figure 32A:
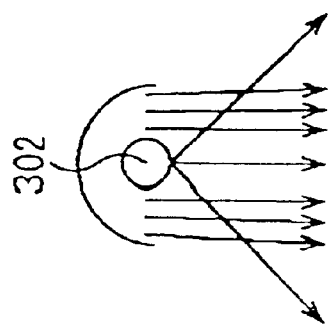
Figure 33:
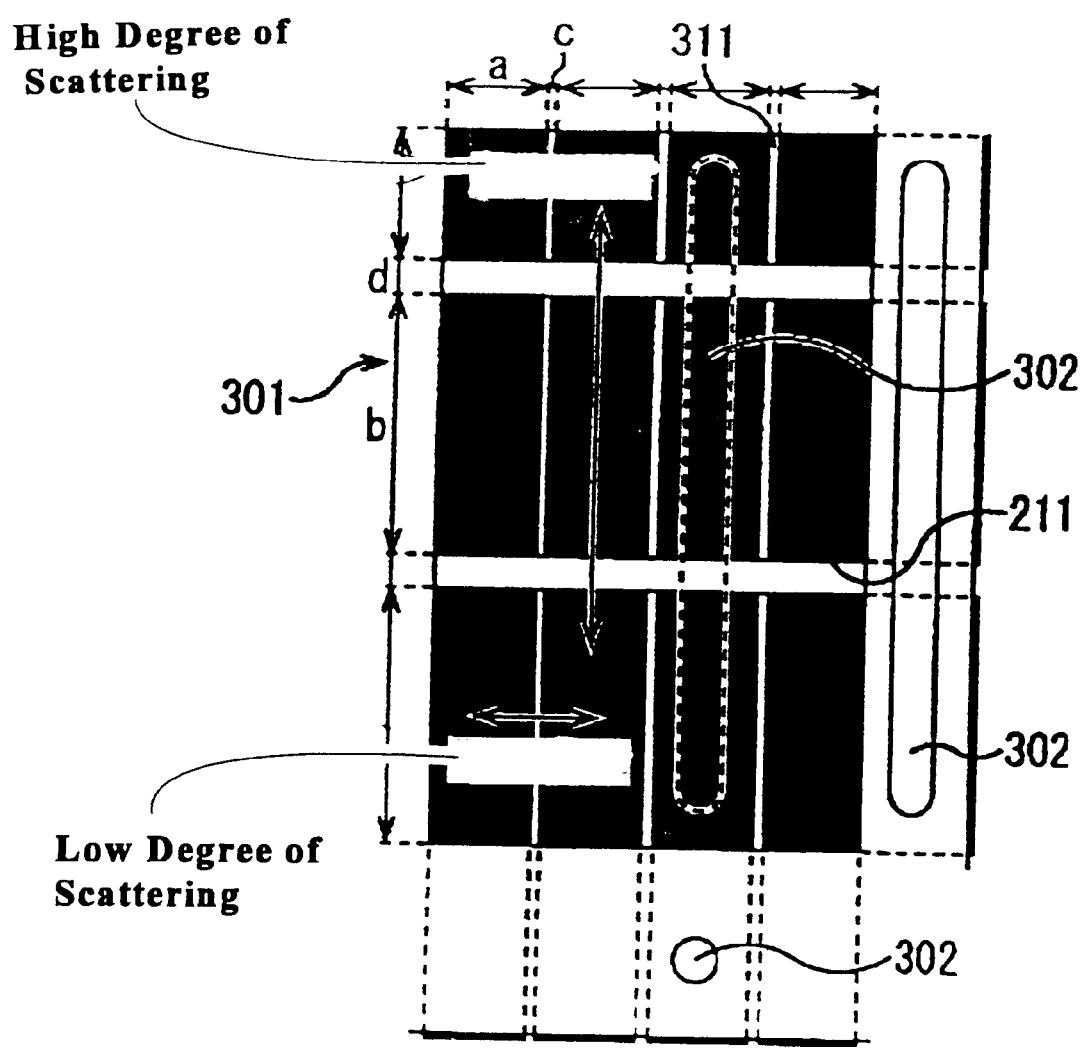
FIG. 33 is a top view shows the relationship between the scattering characteristics of the light source and the slit in the optical mask.

FIGS. 32A and 32B are schematic diagrams of the light source according to another used embodiment. FIG. 33 is a top view showing the relationship between the scattering of the light source and the slit in the optical mask.

A method for changing the direction of the tubular light source 302 is adopted. The lengthwise direction of the light source 302 (FIG. 32B) has higher scattering than the widthwise direction of the light source 302 (FIG. 32A). This characteristic is used in this embodiment.

The lengthwise direction of the light source 302 for ultraviolet light is positioned to be parallel to the direction of the alignment correction slit 311 in the optical mask 301. Thus, the ultraviolet light passing through the alignment correction slit 311 has a narrow scattering width and is positioned perpendicular to the lengthwise direction of the light source 302. The ultraviolet light that passed through the slit 211 that orients the liquid crystal molecules in the desired orientations has a wider scattering width. Therefore, there are no negative effects on the essential orientations of the liquid crystal molecules.

According to this embodiment as described above, because the directions of the alignment control force at the end of the pixel electrode 318 and the force to orient due to the electric field cancel each other, tilting the liquid crystal molecules in the direction perpendicular to the desired tilt direction for the liquid crystal molecules can be prevented. Therefore, the occurrence of disclinations is prevented, and a decrease in the brightness at the ends of the pixels can be suppressed.

Because new rib-shaped parts do not have to be formed, the process that controls the alignment can be simplified by forming the alignment correction slit 211 and the alignment control slit 311 in the optical mask 301.

Figure 34:
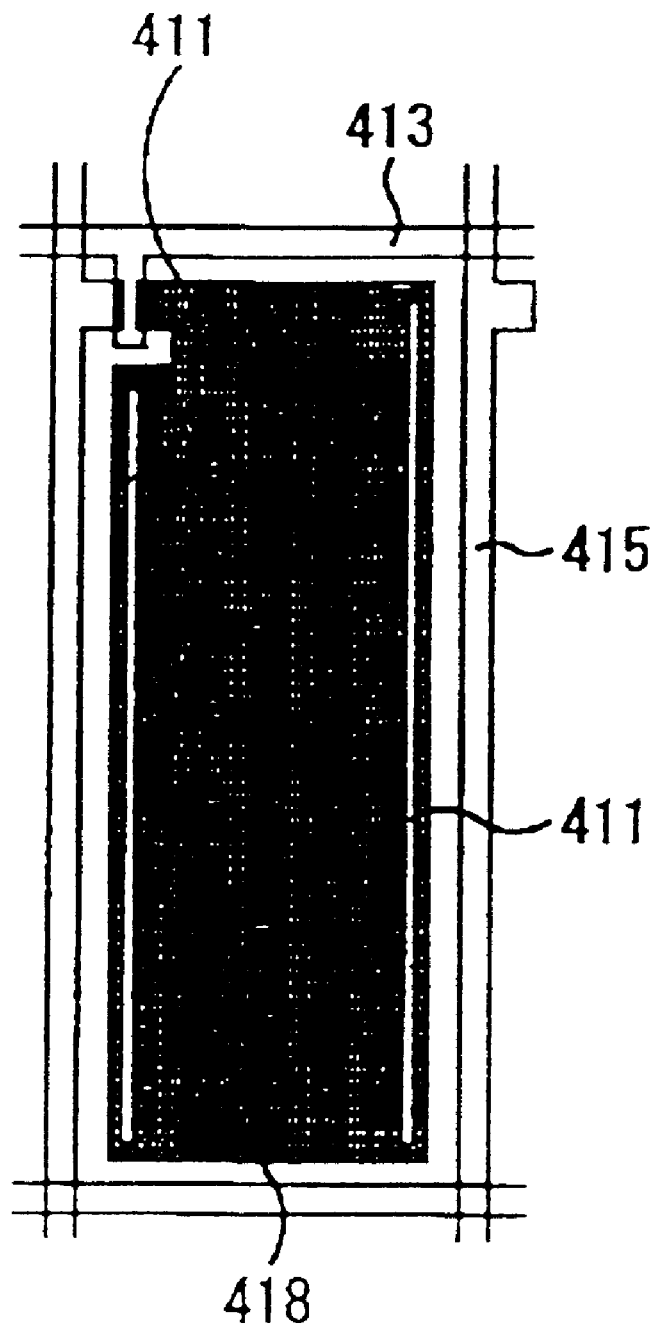
FIG. 34 is a top view shows the vicinity of a pixel electrode in the liquid crystal display device in a fifth embodiment.

A further embodiment of a liquid crystal display device featuring a pixel electrode is described with reference to FIG. 34.

The alignment film in this embodiment is composed of two polymers. Preferably, the pretilt angle of one polymer changes from an initial vertical alignment in response to ultraviolet light exposure and assumes a constant value near 90° when some level of ultraviolet light exposure is exceeded. The pretilt angle of the other polymer starts changing from the vertical alignment in response to ultraviolet light exposure, but resumes vertical alignment when exposed again to ultraviolet light.

To prevent poor orientation caused by the lateral electric field from the data electrode 415, a slit 411 is disposed near the data electrodes 415 of the pixel electrode 418. The slit 411 extends in the direction parallel to the data electrode 415 (direction orthogonal to the gate electrode 413). An effective width for this slit 411 falls in the range from 2 µm to 5 µm. In particular, a 3 µm width for the slit was confirmed as the most effective size for suppressing poor orientation.

Figure 35A:
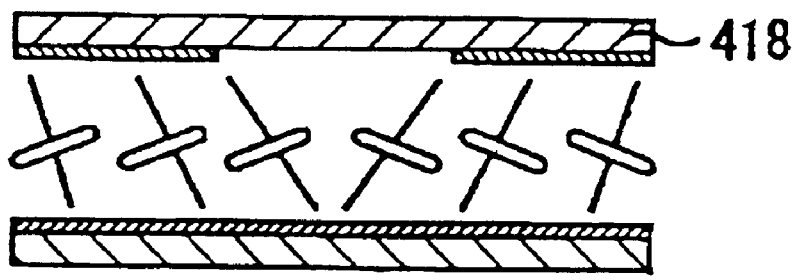
FIGS. 35A and 35B are cross-sectional views showing orientations of the liquid crystal molecules in the pixel electrode formed with a slit.
Figure 35B:
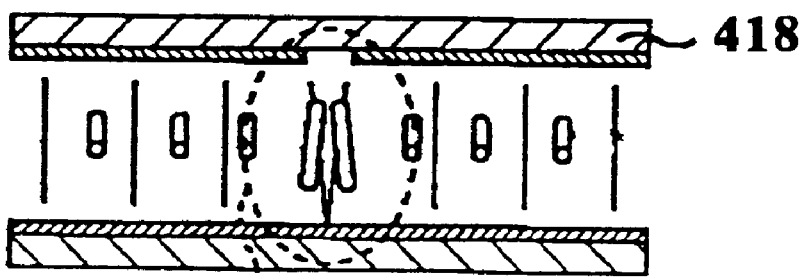
Figure 37:
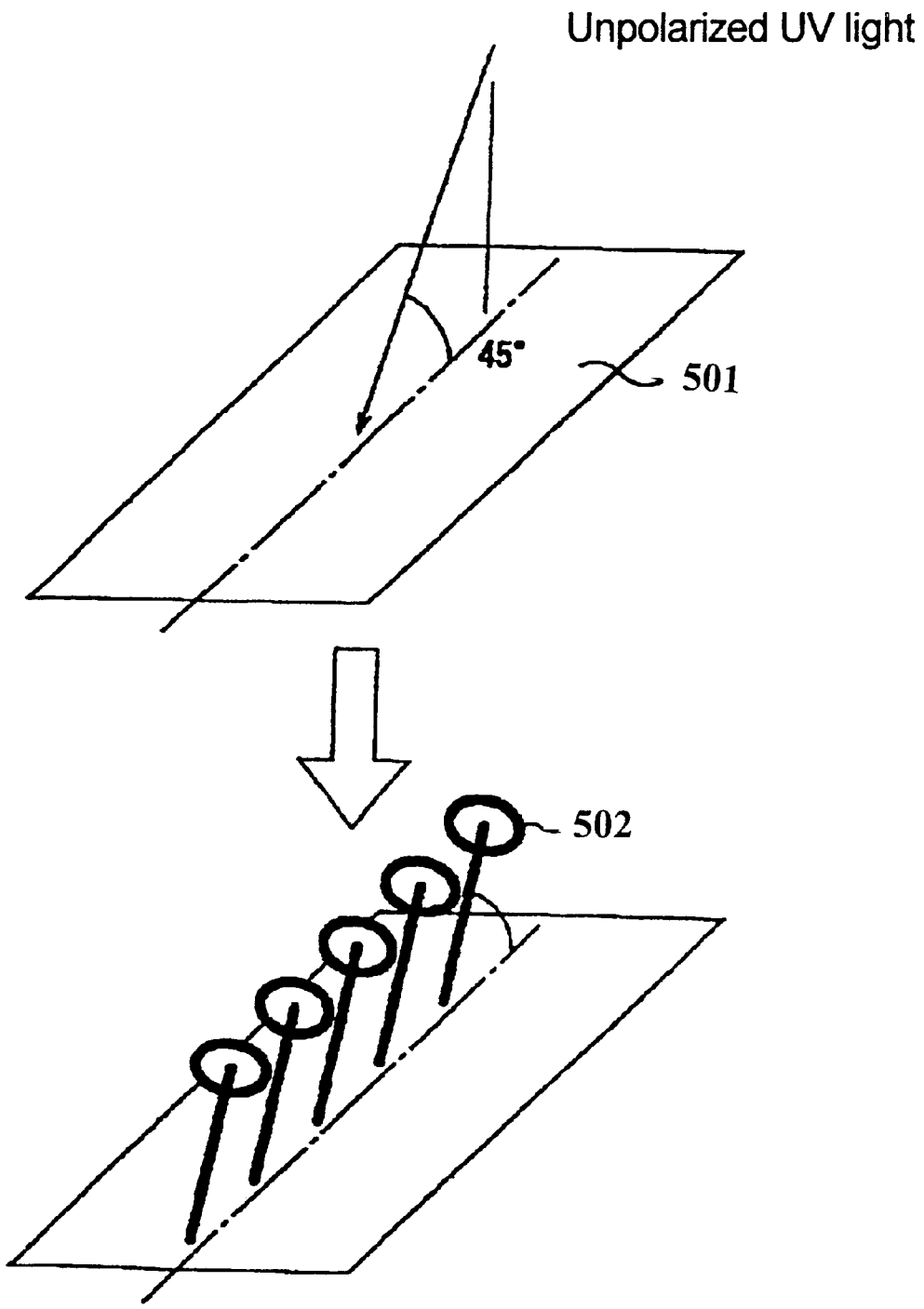
FIG. 37 is a schematic showing the pretilt angle orientation of liquid crystal molecules by alignment films exposed to oblique ultraviolet light.

The provision of a fine slit 411 in the pixel electrodes 418 has the property of making the liquid crystal molecules fall in the direction parallel to this slit 411. In this embodiment, this action is jointly used with the photo-alignment. Essentially, if there is liquid crystal in the gaps between the pixel electrodes, the liquid crystal tilts in the direction away from the gap because the electric field becomes oblique (see FIG. 35A). However, if a fine slit, for example, a 3-µm wide slit 411, is provided, the liquid crystal molecules will tilt on both sides of a slit 411 and the destinations disappear. Consequently, the liquid crystal molecules are oriented to tilt towards the slit direction (see FIG. 35B). If a slit 411 is provided as shown in FIG. 34, the tilts of the liquid crystal molecules similarly lose their destinations because of this slit (FIG. 35B). Consequently, the liquid crystal molecules will tilt in the direction parallel to the slit 411, and poor orientation caused by the data electrode is suppressed.

FIG. 36 is a schematic showing another example of this embodiment. FIG. 36A is a top view of the vicinity of a pixel electrode. FIG. 36B is a cross-sectional view.

A plurality of slits 411 is provided over the entire pixel electrode 418 area. Therefore, the stability of the orientation becomes more reliable. It is important for these slits 411 to be connected by the connector 421 in the center of the pixel electrode 418. If the relationship between the connector 421 and the slits 411 is examined, the electric field at the connector 421 is as shown in FIG. 34B and expands in a fan shape from the connector 421. This effect tilts the liquid crystal molecules in a more preferred direction.

According to this embodiment as described above, a liquid crystal display device with no poor orientations and a wide viewing angle can be implemented.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A liquid crystal display device comprising:
    a pair of substrates in a spaced relationship with one another;
    a pair of alignment films, one said alignment film formed on each said substrate such that said alignment films face one another; and
    a liquid crystal layer, including plural liquid crystals, inserted between said pair of alignment films;
    said alignment films imparting a given pre-tilt angle to the liquid crystals, said alignment films being composed of a material containing at least two types of polymers having a prescribed initial alignment and different alignment variation rates in response to ultraviolet light irradiation;

wherein said given pre-tilt angle is adjusted, without rubbing said alignment films, by exposing said alignment films to ultraviolet light;

wherein said alignment films are comprised of a mixture of polymer x1 which exhibits a change of pre-tilt angle of at least 2° when irradiated with 0.5 (J/cm$^2$) of ultra-violet rays and a polymer x2 which exhibits a change of pre-tilt angle of generally 0.5° when irradiated with at least 0.5 (J/cm$^2$) of ultra-violet rays.

2. A liquid crystal display device according to claim 1, whereby at least one of said alignment films is comprised of a material containing mixtures of said polymers.

3. A liquid crystal display device according to claim 1, whereby said alignment film is comprised of material containing copolymers of said polymers.

4. A liquid crystal display device comprising:

a pair of substrates in a spaced relationship with one another;

a pair of alignment films, one said alignment film formed on each said substrate such that said alignment films face one another; and a liquid crystal layer, including plural liquid crystals, inserted between said pair of alignment films;

said alignment films imparting a given pre-tilt angle to the liquid crystals, said alignment films being composed of a material containing at least two types of polymers having a prescribed initial alignment and different alignment variation rates in response to ultraviolet light irradiation;

wherein said given pre-tilt angle is adjusted, without rubbing said alignment films, by exposing said alignment films to ultraviolet light;

whereby one type of said two types of polymers changes an orientation of the liquid crystal molecules from an initial vertical orientation to a random horizontal orientation, and the other type of said two types of polymers generally maintains said initial orientation of said liquid crystal molecules.

5. A liquid crystal display device according to claim 4, whereby at least one of said alignment films is comprised of a material containing mixtures of said polymers.

6. A liquid crystal display device according to claim 4, whereby said alignment film is comprised of material containing copolymers of said polymers.

7. A liquid crystal display device according to claim 4, wherein said alignment films are composed of at least one of polyimide and polyamic oxide.

8. A liquid crystal display device according to claim 7, wherein said alignment films are comprised of a 20:80 mixture of polymer x1 and polymer x2.

9. A method of aligning an alignment film used to orient liquid crystal molecules in a liquid crystal display device, said method comprising the steps of:

forming an alignment film a substrate, said alignment film being composed of at least two different types of polymers, each type of polymer exhibiting differing alignment variation in response to ultra-violet ray irradiation;

irradiating said alignment film with ultra-violet rays at an oblique angle with respect to a surface of said alignment film;

wherein said alignment film is comprised of a mixture of polymer x1 which exhibits a change of pre-tilt angle of at least 2° when irradiated with 0.5 (J/cm$^2$) of ultra-violet rays and a polymer x2 in which the change of pre-tilt angle is 0.5° when irradiated with 0.5 (J/cm$^2$) of ultra-violet rays.

10. A method of forming an alignment film according to claim 9, wherein said oblique angle is generally less than 45°.

11. A method of forming an alignment film according to claim 9, wherein said alignment film is composed of at least one of polyimide and polyamic oxide.

12. A method of forming an alignment film according to claim 9, wherein said alignment films are comprised of a 20:80 mixture of polymer x1 and polymer x2.

13. A method of aligning an alignment film used to orient liquid crystal molecules in a liquid crystal display device, said method comprising the steps of:

forming an alignment film a substrate, said alignment film being composed of at least two different types of polymers, each type of polymer exhibiting differing alignment variation in response to ultra-violet ray irradiation;

irradiating said alignment film with ultra-violet rays at an oblique angle with respect to a surface of said alignment film, wherein a pre-tilt angle of one type of said at least two types of polymers changing from an initial vertical orientation to a random horizontal orientation in response to ultra-violet irradiation, and another type of said at least two types of polymers generally retains said initial vertical orientation.

14. A method of forming an alignment film according to claim 13, wherein said oblique angle is generally less than 45°.

15. A method of forming an alignment film according to claim 13, wherein said alignment film is composed of at least one of polyimide and polyamic oxide.

16. An alignment film applied to opposing faces of a pair of substrates in a liquid crystal display device and aligning liquid crystal layer disposed therebetween, the alignment film comprising:

a material containing at least two types of polymers with differing alignment variation rates in response to ultra-violet ray irradiation, both said two types of polymers having a prescribed initial alignment for the liquid crystal molecules in the liquid crystal layer;

wherein an alignment of one of the two polymers readily changes from said initial vertical alignment to a second horizontal alignment in response to ultraviolet light exposure, and the other of the two polymers is highly resistant to changes in alignment in response to ultra-violet light exposure.

17. The alignment film according to claim 16, wherein said material includes mixtures of the polymers.

18. The alignment film according to claim 16, wherein said material contains a copolymer of the polymers.

* * * * *